(12) United States Patent
Iwata

(10) Patent No.: US 10,277,826 B2
(45) Date of Patent: Apr. 30, 2019

(54) IMAGE PROCESSING APPARATUS AND IMAGE PROCESSING METHOD

(71) Applicant: CANON KABUSHIKI KAISHA, Tokyo (JP)

(72) Inventor: Takuya Iwata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/693,727

(22) Filed: Sep. 1, 2017

(65) Prior Publication Data
US 2018/0077331 A1    Mar. 15, 2018

(30) Foreign Application Priority Data
Sep. 15, 2016  (JP) ................................. 2016-180206

(51) Int. Cl.
| H04N 5/232 | (2006.01) |
| G09G 3/00 | (2006.01) |
| H04N 5/235 | (2006.01) |
| H04N 5/243 | (2006.01) |
| G09G 3/20 | (2006.01) |

(Continued)

(52) U.S. Cl.
CPC ............. *H04N 5/2351* (2013.01); *G09G 3/00* (2013.01); *G09G 3/20* (2013.01); *G09G 3/3406* (2013.01); *H04N 5/23293* (2013.01); *H04N 5/243* (2013.01); *G09G 2320/0271* (2013.01); *G09G 2320/0606* (2013.01); *G09G 2320/0646* (2013.01); *G09G 2320/0666* (2013.01); *G09G 2360/16* (2013.01); *H04N 5/57* (2013.01)

(58) Field of Classification Search
CPC .. H04N 5/2351; H04N 5/243; H04N 5/23293; H04N 5/57; G09G 3/00; G09G 3/3406; G09G 3/20; G09G 2320/0646; G09G 2320/0606; G09G 2320/0271; G09G 2320/0666; G09G 2360/16
See application file for complete search history.

(56) References Cited

U.S. PATENT DOCUMENTS

2006/0056684 A1* 3/2006 Kurane ................... G06T 5/009
   382/162
2014/0368527 A1* 12/2014 Fujine ..................... H04N 5/20
   345/589

(Continued)

FOREIGN PATENT DOCUMENTS

| JP | 2013-161018 A | 8/2013 |
| JP | 2016-033760 A | 3/2016 |

*Primary Examiner* — Hung H Lam
(74) *Attorney, Agent, or Firm* — Venable LLP

(57) ABSTRACT

An image processing apparatus includes: at least one processor for executing a program stored in at least one memory to perform functions of: a first acquiring unit configured to acquire RAW image data; a second acquiring unit configured to acquire first brightness information related to first brightness, which is display brightness of a display unit to be used for displaying an image based on the RAW image data; a setting unit configured to set a development parameter to be used for development processing, based on the first brightness information acquired by the second acquiring unit; and a developing unit configured to perform the development processing using the development parameter set by the setting unit, on the RAW image data acquired by the first acquiring unit.

22 Claims, 13 Drawing Sheets

(51) Int. Cl.
*G09G 3/34* (2006.01)
*H04N 5/57* (2006.01)

(56) References Cited

U.S. PATENT DOCUMENTS

2018/0040279 A1* 2/2018 Kimura ............. G02F 1/133602
2018/0068637 A1* 3/2018 Ninan .................. G09G 3/3426

* cited by examiner

IMAGE PROCESSING APPARATUS AND IMAGE PROCESSING METHOD

BACKGROUND OF THE INVENTION

Field of the Invention

The present invention relates to an imaging processing apparatus and an image processing method.

Description of the Related Art

Imaging apparatuses which can generate RAW image data by imaging have become popular, hence opportunities to generate RAW image data by imaging are increasing. RAW image data is image data (unprocessed image data) which indicates the output values of an imaging unit (image pickup element). Further, recently there are more and more cases where RAW image data, which is captured image data generated by imaging (captured image data; image data representing an object), is provided from a first site, where the captured image data is used, to a second site, where the captured image data is used. The first site is, for example, a site where imaging is performed, or an editing site where the RAW image data is edited. The second site is, for example, an editing site, or a viewing site where the captured images (images based on the captured image data) is viewed.

To display an image based on the RAW image data on a display apparatus, development processing must be performed on the RAW image data. Development processing includes demosaic processing, gamma correction processing and white balance adjustment processing. By changing a development parameter (parameter which is used for the development processing), such image qualities as the contrast of the display image (image which is displayed on the display apparatus) and the white balance of the display image can be changed. Therefore in some cases, a development parameter, in accordance with the preference of the individual in the first site (e.g. photographer, editor) may be determined in the first site. In the case of determining a development parameter in the first site, this development parameter from the first site may be provided to the second site. If the development parameter provided from the first site is used in the second site, the display image having an image quality intended by the individual in the first site can be confirmed in the second site. For example, the display image having approximately the same image quality as the image quality of the display image confirmed in the first site can be confirmed in the second site.

Further, the display brightness (brightness of the screen of the display apparatus; brightness of the display image) is increasing. A wide display brightness range (range of display brightness) is sometimes called high dynamic range (HDR). In the liquid crystal display apparatus, the display brightness can be increased by increasing the emission brightness of the backlight unit, for example. An example of a liquid crystal display apparatus having a backlight unit, of which upper limit of the emission brightness is high, is a liquid crystal display apparatus which can implement display brightness that is several tens time the display brightness of a conventional display apparatus. Therefore, for instance, the brightness of the display apparatus that is used in the first site and the brightness of the display apparatus that is used in the second site are diversifying. As a result, a situation where the brightness confirmed in the first site is different from the display brightness confirmed in the second site could occur. For example, the display brightness that is confirmed in the first site may be several ten times higher than the display brightness confirmed in the second site, or the display brightness confirmed in the first site may be several ten times lower than the display brightness confirmed in the second site.

Prior arts on the display brightness control method, the image processing control method, and the like are disclosed in, for example, Japanese Patent Application Publication Nos. 2013-161018 and 2016-033760. In the technique disclosed in Japanese Patent Application Publication No. 2013-161018, the emission brightness of the backlight unit and the brightness of the image data are controlled in accordance with the characteristic value of the image data. And in the technique disclosed in Japanese Patent Application Publication No. 2016-033760, the display brightness is controlled in accordance with the illuminance of the ambient environment of the display apparatus, and the display setting (e.g. setting of character colors) is controlled based on the continuous operation time of the application. In the technique disclosed in Japanese Patent Application Publication No. 2016-033760 as well, the display brightness is controlled in accordance with the rotation angle of the display apparatus.

In the case where a plurality of display apparatuses, which have mutually different limits of the display brightness, display images respectively based on the same image data, the gradation brightness characteristics (correspondence between the gradation value and the display brightness) are different among the plurality of display apparatuses. A case where a first display apparatus of which upper limit of the display brightness is 100 [$cd/m^2$], and the second display apparatus of which upper limit of the display brightness is 4000 [$cd/m^2$] respectively display the same image data having a 10-bit gradation value (0 to 4095), is considered. The lower limit of the display brightness is 0 in both the first display apparatus and the second display apparatus respectively. In this case, in the first display apparatus, a 0 to 4095 gradation range (range of gradation values) is assigned to the 0 to 100 [$cd/m^2$] display brightness range. In the second display apparatus, on the other hand, a 0 to 4095 gradation range is assigned to the 0 to 4000 [$cd/m^2$] display brightness range. Therefore the display brightness of an object, the display brightness distribution (distribution of the display brightness) of the object and the like are different between the first display apparatus and the second display apparatus. In other words, the appearance of the display image is different between the first display apparatus and the second display apparatus.

In the prior arts, this difference of display brightness is not considered. Therefore in some cases, an image based on the RAW image data may not be displayed in the same manner as the previous display (for instance, display in a case where the RAW image data was generated, display in a case where the RAW image data was edited). For example, in the second site, a display equivalent to the display in the first site may not be performed. In other words, in some cases the appearance of the display image in the second site may be different from the appearance of the display image in the first site.

SUMMARY OF THE INVENTION

The present invention in its first aspect provides an image processing apparatus, comprising:

at least one processor for executing a program stored in at least one memory to perform functions of:

a first acquiring unit configured to acquire RAW image data;

a second acquiring unit configured to acquire first brightness information related to first brightness, which is display brightness of a display unit to be used for displaying an image based on the RAW image data;

a setting unit configured to set a development parameter to be used for development processing, based on the first brightness information acquired by the second acquiring unit; and a developing unit configured to perform the development processing using the development parameter set by the setting unit, on the RAW image data acquired by the first acquiring unit.

The present invention in its second aspect provides an image processing method, comprising:

a first acquiring step of acquiring RAW image data;

a second acquiring step of acquiring first brightness information related to first brightness, which is display brightness of a display unit to be used for displaying an image based on the RAW image data;

a setting step of setting a development parameter to be used for development processing, based on the first brightness information acquired in the second acquiring step; and a developing step of performing the development processing using the development parameter set in the setting step, on the RAW image data acquired in the first acquiring step.

The present invention in its third aspect provides a non-transitory computer readable medium that stores a program, wherein the program causes a computer to execute:

a first acquiring step of acquiring RAW image data;

a second acquiring step of acquiring first brightness information related to first brightness, which is display brightness of a display unit to be used for displaying an image based on the RAW image data;

a setting step of setting a development parameter to be used for development processing, based on the first brightness information acquired in the second acquiring step; and a developing step of performing the development processing using the development parameter set in the setting step, on the RAW image data acquired in the first acquiring step.

Further features of the present invention will become apparent from the following description of exemplary embodiments with reference to the attached drawings.

DESCRIPTION OF THE EMBODIMENTS

Practical Example 1

Practical Example 1 of the present invention will be described next.

An example where an image processing apparatus according to Practical Example 1 is disposed in a display apparatus will be described below, but the image processing apparatus according to Practical Example 1 may be an apparatus that is separate from the display apparatus. For the image processing apparatus according to Practical Example 1, a display apparatus, a reproducing apparatus, a personal computer (PC) or the like can be used.

In the following, an example where the image display apparatus according to the Practical Example 1 is a transmission type liquid crystal display apparatus is described, but the display apparatus according to Practical Example 1 is not limited to a transmission type liquid crystal display apparatus. As a display apparatus according to Practical Example 1, a different display apparatus, having a light emitting unit and a display panel which displays an image on the screen by modulating light from the light emitting unit, may be used. For example, as the display apparatus according to Practical Example 1, a reflection type liquid crystal display apparatus, a micro electromechanical system (MEMS) shutter type display apparatus which includes MEMS shutters as display elements, a projector or the like, may be used. Further, as the display apparatus according to Practical Example 1, a spontaneous emission type display apparatus, such as an organic EL display apparatus and a plasma display apparatus, may be used.

Figure 1:
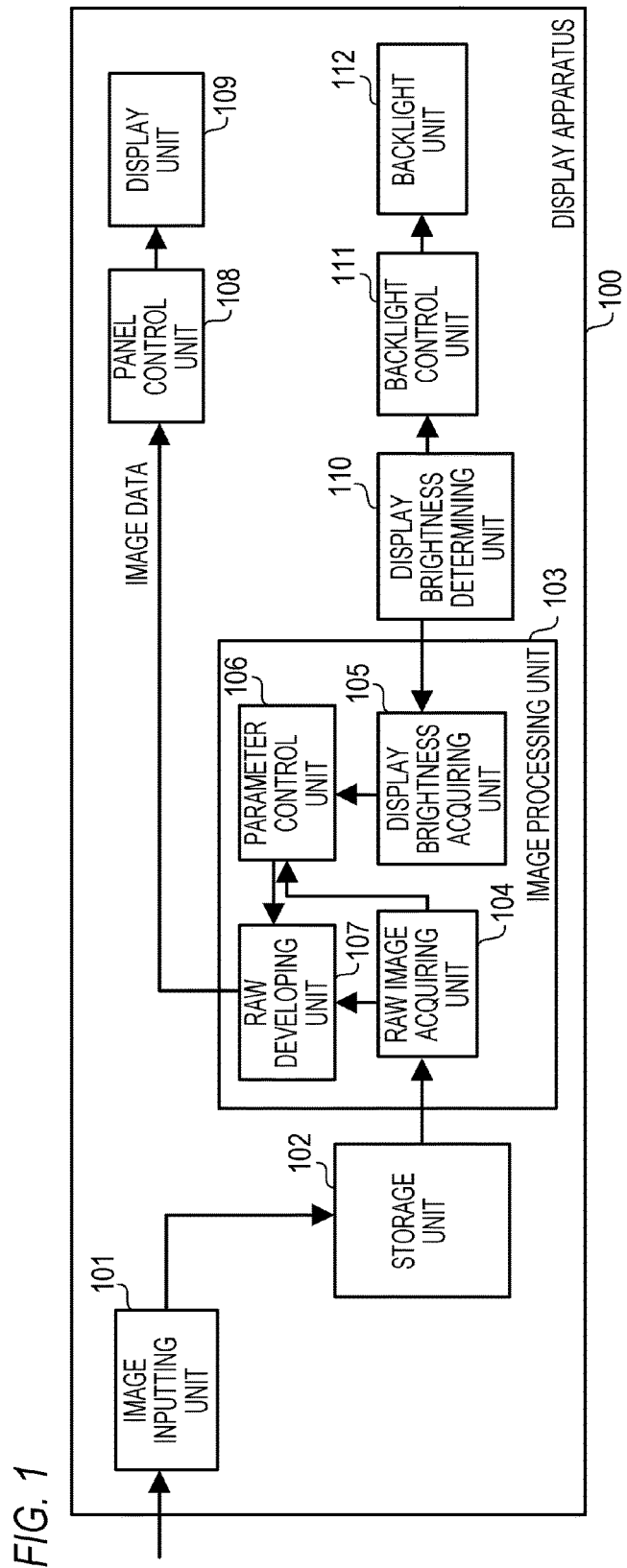
FIG. 1 is a block diagram depicting an example of a functional configuration of a display apparatus according to Practical Example 1.

FIG. 1 is a block diagram depicting an example of a functional configuration of a display apparatus 100 according to Practical Example 1. As depicted in FIG. 1, the display apparatus 100 includes an image inputting unit 101, a storage unit 102, an image processing unit 103, a panel control unit 108, a display unit 109, a display brightness determining unit 110, a backlight control unit 111 and a backlight unit 112.

The image inputting unit 101 acquires RAW image data from an outside source, and records the acquired RAW image data in a storage unit 102 as input image data. The RAW image data is image data generated by imaging (captured image data; image data representing an object), and is image data (unprocessed image data) indicating the output values of an imaging unit (image pickup element). The RAW image data may be acquired via a cable or may be acquired wirelessly. The RAW image data may be acquired by reading the RAW image data stored in a storage apparatus (not illustrated) from the storage apparatus. The storage apparatus may be an apparatus embedded in the display apparatus 100 or may be an apparatus that is removable from the display apparatus 100. In the following example, a case where the input image data is a RAW image data of a still image will be described, but the input image data may be a RAW image data of a moving image. If the input image data is the RAW image data of a moving image, the processing described below is performed for each frame of the moving image, for example.

The storage unit 102 is a storage apparatus which stores various data (e.g. input image data). For the storage unit 102, a hard disk drive (HDD), a ROM, a RAM or the like is used. The storage unit 102 may be an apparatus embedded in the display apparatus 100, or may be an apparatus that is removable from the display apparatus 100.

The image processing unit 103 acquires the RAW image data, which is input image data, from the storage unit 102, and generates the developed image data by performing the development processing on the acquired RAW image data. The development processing includes demosaic processing, gamma correction processing and white balance adjustment processing. The image processing unit 103 outputs the developed image data to the panel control unit 108. In Practical Example 1, the image processing unit 103 acquires the first brightness information on first brightness which is a reference display brightness of the display apparatus 100, and sets the development parameters (parameters which are used for development processing) based on the first brightness information. The display brightness is the brightness on a screen, and is brightness of a displayed image (image displayed on a screen). By using the development parameters, which were set as described above, for the development processing, the display of the display apparatus 100 (display of an image based on the RAW image data) is made to be closer to the previous display. The previous display is, for example, the display in a case where the RAW image data was generated, or the display in a case where the RAW image data was edited. The "display in a case where the RAW image data was generated" can also be the "display in a case where imaging was performed".

In Practical Example 1, the first brightness is display brightness which is set as the upper limit of the display brightness of the display apparatus 100. The first brightness is not especially limited. For example, the first brightness may be display brightness corresponding to the center of the display brightness range of the display apparatus 100. The format of the first brightness information is also not especially limited. For example, the first brightness information may be information that directly indicates the first brightness, or may be information that indirectly indicates the first brightness. In concrete terms, the first brightness information may be information in which the first brightness itself is written, or may be information on which an operation mode corresponding to the first brightness, an identifier of the operation mode corresponding to the first brightness, an identifier of the first brightness and the like are written. In the first brightness information, the first brightness may be indicated by a coefficient determined by a standard, an ID determined by a standard or the like.

The image processing unit 103 may record the developed image data in the storage unit 102 without outputting the developed image data to the panel control unit 108. Then the panel control unit 108 may read the developed image data from the storage unit 102. The image processing unit 103 may be configured by hardware or software.

The image processing unit 103 corresponds to the above mentioned image processing apparatus (image processing apparatus according to Practical Example 1). The image processing unit 103 may be an apparatus that is separated from the display apparatus 100. At least one of a plurality of functional units of the display apparatus 100 may be embedded in the image processing unit 103.

The panel control unit 108 controls the processing of the display unit 109 based on the developed image data which was outputted from the image processing unit 103. The method of controlling the processing of the display unit 109 is not especially limited. In Practical Example 1, the display unit 109 is a liquid crystal panel which includes a plurality of liquid crystal elements. The panel control unit 108 generates a panel control signal to control the transmittance of each liquid crystal element based on the developed image data. For example, as the panel control signal, a voltage signal, to control the voltage that is applied to each liquid crystal element, is generated. Then the panel control unit 108 outputs the panel control signal to the display unit 109. Thereby the display unit 109 controls the transmittance of each liquid crystal element to a transmittance in accordance with the developed image data (especially the panel control signal). By the light from the backlight unit 112 transmitting through the display unit 109 (each liquid crystal element) at a transmittance in accordance with the developed image data, an image based on the developed image data is displayed on the screen.

The display brightness determining unit 110 determines the above mentioned first brightness, and outputs first brightness information on the determined first brightness to the image processing unit 103 and the backlight control unit 111. The method of determining the first brightness is not especially limited. For example, the first brightness may be determined in accordance with the operation which the user performed with the display apparatus 100 using an operation inputting unit (e.g. buttons disposed on the display apparatus 100, controller of the display apparatus 100; not illustrated). In concrete terms, the display brightness specified by the user may be determined as the first brightness. Further, the first brightness may be adaptively determined based on: a measurement result by a sensor (not illustrated), which measures the brightness around the display apparatus 100; a measurement result by a sensor (not illustrated) which measures the temperature of the display apparatus 100; a characteristic of the RAW image data which is input image data; and the like. The first brightness may be a predetermined fixed value. In this case, display brightness that is common to a plurality of the same kind of display apparatuses as this display apparatus 100 may be used as the first brightness, or display brightness, which is independently determined for each of a plurality of apparatuses, may be used as the first brightness.

The backlight control unit 111 controls the processing of the backlight unit 112 based on the first brightness information from the display brightness determining unit 110. The method of controlling the processing of the backlight unit 112 is not especially limited. In Practical Example 1, based on the first brightness information, the backlight control unit 111 generates a backlight control signal, which controls the emission brightness of the backlight unit 112 to the emission brightness corresponding to the first brightness. For example, as the backlight control signal, a PWM signal, which controls the pulse width of the pulse signal to-be-supplied to the backlight unit 112, is generated. Further, as the backlight control signal, a PAM signal, which controls the pulse amplitude of the pulse signal, may be generated, or a PHM signal, which controls both the pulse width and the pulse amplitude, may be generated. The backlight control unit 111 outputs the backlight control signal to the backlight unit 112. Thereby, the emission brightness of the backlight unit 112 is controlled to the emission brightness corresponding to the first brightness. The "emission brightness corresponding to the first brightness" is the "emission brightness that is exactly the same as the first brightness", the "emission brightness that is slightly higher than the first brightness" or the like. The light from the backlight unit 112 is irradiated onto the rear surface of the display unit 109. The display brightness is controlled to the display brightness corresponding to the first brightness by controlling the emission brightness of the backlight unit 112 to the emission brightness corresponding to the first brightness.

Figure 2:
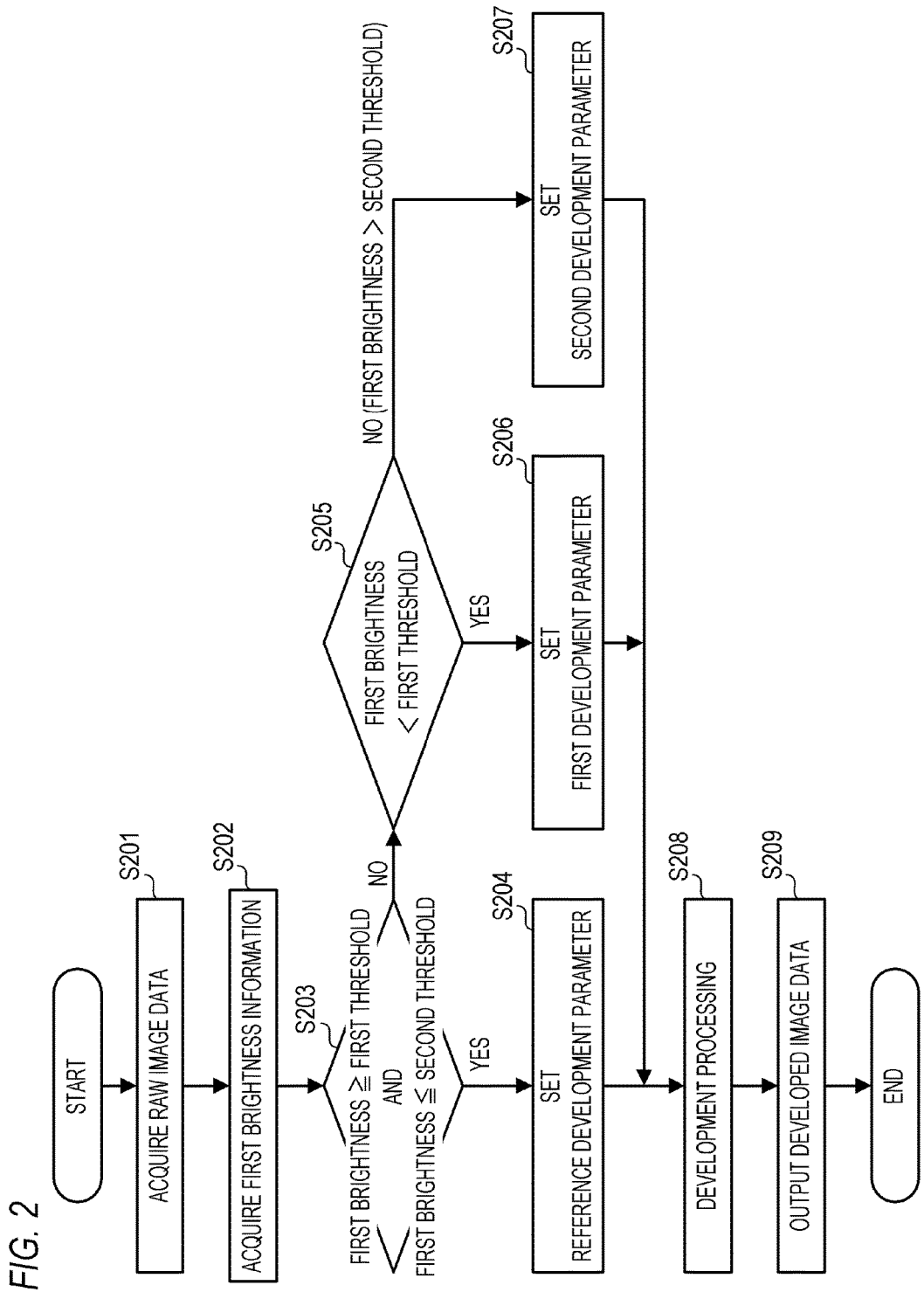
FIG. 2 is a flow chart depicting an example of a processing flow of the display apparatus according to Practical Example 1.

The image processing unit 103 will be described next in detail. The image processing unit 103 has a RAW image acquiring unit 104, a display brightness acquiring unit 105, a parameter control unit 106, and a RAW developing unit 107. FIG. 2 is a flow chart depicting an example of the processing flow of the image processing unit 103. The processing of each functional unit of the image processing unit 103 will be described with reference to the flow chart in FIG. 2.

First the RAW image acquiring unit 104 acquires the RAW image data, which is input image data, from the storage unit 102 (step S201). Then the display brightness acquiring unit 105 acquires the first brightness information from the display brightness determining unit 110 (step S202). The processing in step S202 may be performed in parallel with the processing in step S201, or the processing in step S202 may be performed before the processing in step S201.

Then the parameter control unit 106 determines whether the first brightness related to the acquired first brightness information is at least the first threshold and not more than the second threshold (step S203). If the first brightness is at least the first threshold and not more than the second threshold, processing advances to step S204. If the first brightness is less than the first threshold or more than the second threshold, processing advances to step S205.

The first threshold and the second threshold are not especially limited. The second threshold can be any value not less than the first threshold. For example, for the first threshold, display brightness close to the lower limit display value in the generally used standard display brightness range is selected. And for the second threshold, display brightness close to the upper limit display brightness in the generally used standard display range is selected. Each of the first threshold and the second threshold may be a fixed value that is predetermined for the display apparatus 100, or may be a value that can be appropriately changed. For example, an instruction to update each of the first threshold and the second threshold may be sent from outside the display apparatus 100 to the display apparatus 100 via a communication unit (not illustrated). Then in the display apparatus 100, the first threshold and the second threshold may be updated respectively in accordance with an instruction from outside the display apparatus 100. In the case where an image based on the RAW image data is displayed using an application installed in the display apparatus 100, the first threshold and the second threshold may be changed respectively, depending on the type of application.

The case where the processing advances from step S203 to step S204 will be described. In step S204, the parameter control unit 106 sets a reference development parameter. The reference development parameter is not especially limited. For example, the development parameter which was used in the previous display of the image based on the RAW image data can be used as the reference development parameter. Further, as the reference development parameter, the development parameter for which demosaic processing was performed, but such image quality adjustment processing as gamma correction processing and white balance adjustment processing was not performed, may be used. If the development parameter has already been determined in a case where the reference development parameter is set, the "predetermined development parameter" can be regarded as the "reference development parameter".

The reference development parameter may be a development parameter which is predetermined for the display apparatus 100, or may be a development parameter which can be appropriately changed. The display apparatus 100 may have a development parameter storing unit (not illustrated) configured to store a predetermined reference development parameter. The reference development parameter may be acquired from outside the display apparatus 100. The method of acquiring the reference development parameter is not especially limited. The development parameter included in the meta data of the RAW image data may be used as the reference development parameter. In this case, the parameter control unit 106 extracts the reference development parameter from the meta data. The RAW image data and the reference development parameter may be independently acquired. Imaging information on the imaging conditions of the RAW image data may be included in the meta data of the RAW image data. And the parameter control unit 106 may extract the imaging information from the meta data, and generate (acquire) a reference development parameter from the imaging conditions of the RAW image data according to a predetermined algorithm. The parameter control unit 106 may acquire the reference development parameter in accordance with an operation which the user performed with the display apparatus 100 using an operation inputting unit. In concrete terms, as the reference development parameter, the parameter control unit 106 may acquire the development parameter specified by the user. In this case, the reference development parameter is appropriately changed in accordance with an instruction from the user. The reference development parameter may be acquired by a function unit that is different from the parameter control unit 106.

Then the RAW developing unit 107 performs the development processing on the RAW image data acquired by the RAW image acquiring unit 104, using the development parameters which were set by the parameter control unit 106 (step S208). Thereby the developed image data is generated. Then the RAW developing unit 107 outputs the generated developed image data to the panel control unit 108 (step S209).

In this way, according to Practical Example 1, the development processing using the reference development parameter is performed in a case where the first brightness is at least the first threshold and not more than the second threshold. In other words, the development processing using the reference development parameter is performed in a case where the first brightness is equivalent to the reference display brightness of a standard display apparatus. In the previous display, it is highly probable that the display brightness, which is at least the first threshold and not more than the second threshold, was used as the reference display brightness, and the development parameter close to the reference development parameter was used. Therefore in Practical Example 1, the development processing using the reference development parameter is performed in a case where the first brightness is at least the first threshold and not more than the second threshold, whereby display close to the previous display can be implemented.

The case where the processing advances from step S203 to step S205 will be described. In step S205, the parameter control unit 106 determines whether the first brightness related to the acquired first brightness information is less than the first threshold. If the first brightness is less than the first threshold, processing advances to step S206. If the first brightness is not less than the first threshold, that is, if the first brightness is higher than the second threshold, processing advances to step S207. In a case where the first brightness is less than the first threshold or the first brightness is higher than the second threshold, processing may advance to step S204.

The case where the processing advances from step S205 to step S206 will be described. In step S206, the parameter control unit 106 sets the first development parameter. Then the processing in step S208 and the processing in step S209 are performed. The first development parameter may be a predetermined development parameter or may be a development parameter which can be appropriately changed. In Practical Example 1, the parameter control unit 106 generates the first development parameter by correcting the reference development parameter.

In the case where the first brightness is less than the first threshold and the reference development parameter is used, it is highly probable that the display will be darker than the previous display. Therefore in Practical Example 1, the development parameter, which satisfies the following condition 1-1 for at least one of a plurality of possible gradation values of the RAW image data, is used as the first development parameter. In Practical Example 1, the display brightness is higher as the gradation value of the developed image data is greater. Therefore the condition 1-1 can be regarded as the following condition 1-2. The correspondence between the gradation value of the developed image data and the display brightness is not especially limited. For example, the display brightness may be higher as the gradation value of the developed image data is lesser.

Condition 1-1: As the display brightness of the display apparatus 100 corresponding to the gradation value after the development processing is performed, display brightness, which is higher than the display brightness implemented in the case of using the reference development parameter, is implemented.

Condition 1-2: As a gradation value after the development processing is performed, a gradation value, which is greater than the gradation value acquired in the case of using the reference development parameter, is acquired.

Figure 3A:
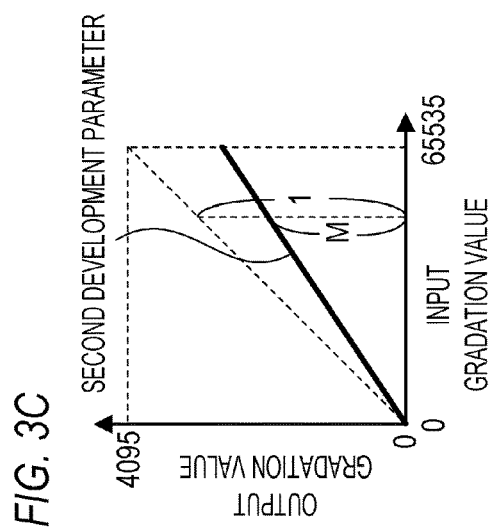
FIGS. 3A to 3C show an example of the conversion characteristic of the development processing according to Practical Example 1.
Figure 3B:
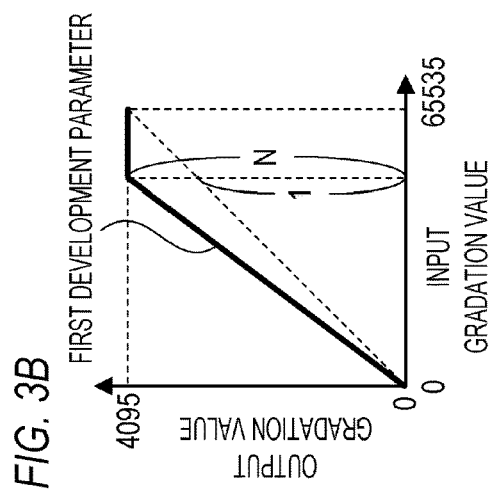

FIGS. 3A and 3B show an example of correspondence between the gradation value of the RAW image data (input gradation value) and the gradation value of the developed image data (output gradation value). The correspondence between FIGS. 3A and 3B can be regarded as a "conversion characteristic of the development processing". FIG. 3A depicts an example in a case where the reference development parameter is used, and FIG. 3B depicts an example in a case where the first development parameter is used. In Practical Example 1, the input gradation value is a 16-bit gradation value (0 to 65,535), and the output gradation value is a 12-bit gradation value (0 to 4095). The number of bits of the input gradation value and the number of bits of the output gradation value are not especially limited.

In a case where the reference development parameter is used, the output gradation value increases linearly from 0 to 4095 as the input gradation value increases from 0 to 65,535, as depicted in FIG. 3A. In a case where the first development parameter is used, on the other hand, each input gradation value is converted into an output gradation value that is greater than the output gradation value in FIG. 3A, as depicted in FIG. 3B. In concrete terms, in FIG. 3B, in a case where the input gradation value increases from 0, the output gradation value increases linearly from 0 at an inclination (inclination of change of the output gradation value with respect to the change of the input gradation value) that is larger than the inclination in FIG. 3A. An input gradation value exceeding the input gradation value, of which output gradation value reaches the upper limit (4095), is converted into the input gradation value of which output gradation value is the upper limit.

The first development parameter to implement the correspondence in FIG. 3B can be acquired by correcting the reference development parameter, so that the inclination of the correspondence in FIG. 3A is multiplied by N (N is greater than 1). The value N may be a predetermined fixed value or a value that can be appropriately changed. For example, the value N may be determined based on the difference between the first brightness and the first threshold. A case where the first brightness is less than the first threshold and the reference development parameter is used will be considered. In this case, it is highly probable that the difference of the display brightness from that in the previous display is larger as the difference between the first brightness and the first threshold is larger. Therefore it is preferable to set the first development parameter such that at least one of a plurality of possible gradation values of the RAW image data satisfies the following condition 2. For example, such a first development parameter can be acquired by using a value N which was determined in a case where the difference between the first brightness and the first threshold is large.

Condition 2: As the difference between the display brightness implemented in the case of using the reference development parameter, and the display brightness implemented in the case of using the first development parameter, a larger difference is implemented as the difference between the first brightness and the first threshold is larger.

The correspondence between the input gradation value and the output gradation value is not limited to the correspondences in FIGS. 3A and 3B. For example, the output gradation value may change non-linearly with respect to the change of the input gradation value. The correspondence of the input gradation value and the output gradation value may be any correspondence as long as the condition 1-1 is satisfied for at least one of a plurality of possible gradation values of the RAW image data.

Figure 4A:
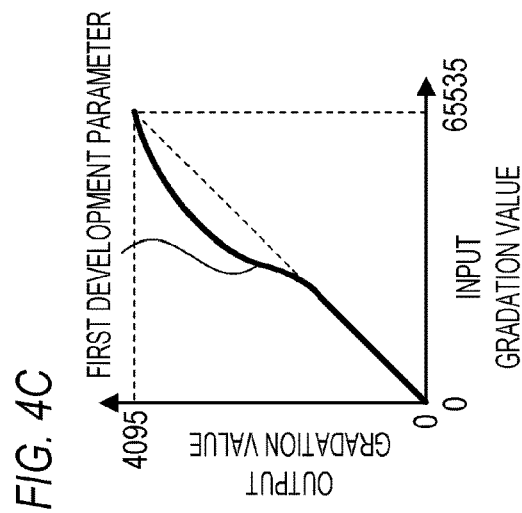
FIGS. 4A to 4C show an example of the conversion characteristic of the development processing according to Practical Example 1.
Figure 4B:
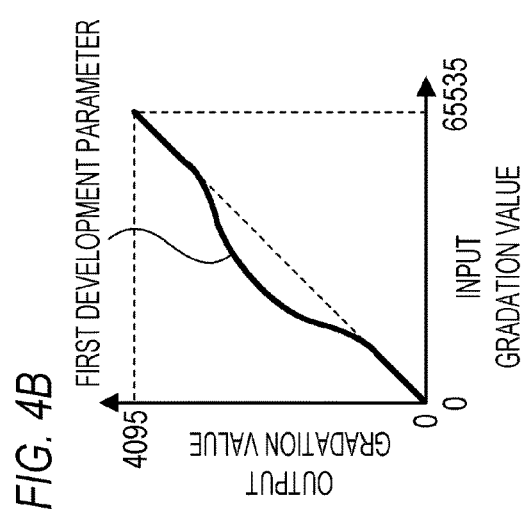
Figure 4C:
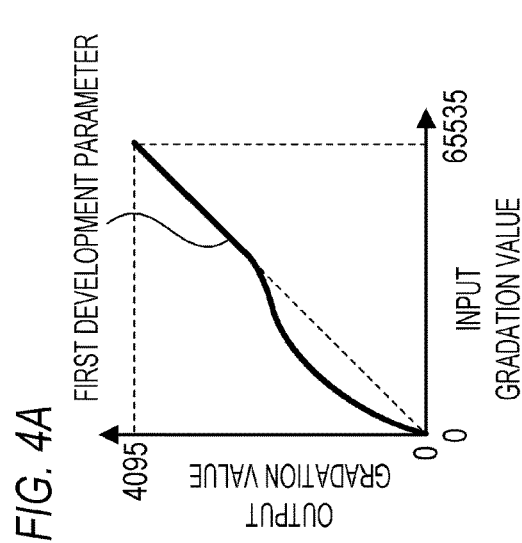

FIGS. 4A to 4C are other examples of the correspondence between the input gradation value and the output gradation value. FIGS. 4A to 4C are cases in a case where the first development parameter is used respectively. In FIG. 4A, an input gradation value in a low gradation range (range of low input gradation values) is converted into an output gradation value, which is greater than the output gradation value in FIG. 3A, and the input gradation value outside the low gradation range is converted into an output gradation value, which is the same as the output gradation value in FIG. 3A. In FIG. 4B, an input gradation value in an intermediate gradation range (range of intermediate input gradation values which are neither high nor low) is converted into an output gradation value that is greater than the output gradation value in FIG. 3A, and an input gradation value outside the intermediate gradation range is converted into an output gradation value that is the same as the output gradation value in FIG. 3A. In FIG. 4C, an input gradation value in the high gradation range (range of high input gradation values) is converted into an output gradation value that is greater than the output gradation value in FIG. 3A, and an input gradation value outside the high gradation range is converted into an output gradation value that is the same as the output gradation value in FIG. 3A. The way of determining the low gradation range, the intermediate gradation range, and the high gradation range is not limited.

The gradation increase range (range of input gradation values which are converted into each output gradation value that is greater than the output gradation value in the case of using the reference development parameter) of the first development parameter may be predetermined, or may be appropriately changed. For example, the gradation increase range may be determined by the parameter control unit 106 in accordance with the operation which the user performed with the display apparatus 100 using an operation inputting unit. The parameter control unit 106 may also determine the gradation increase range in accordance with the characteristic of the RAW image data. In this case, the parameter control unit 106 determines the first development parameter based on the determined gradation increase range. The parameter control unit 106 may determine the first development parameter, the correspondence of the first development parameter (correspondence between the input gradation value and the output gradation value) or the like, instead of determining the gradation increase range.

A plurality of first development parameters may be provided in advance. Then the parameter control unit 106 may select one of the plurality of first development parameters in accordance with an operation which the user performed with the display apparatus 100, a characteristic of the RAW image data and the like. For example, three first development parameters corresponding to FIGS. 4A to 4C may be provided. Then the parameter control unit 106 may select and set one of the three first development parameters in accordance with an operation which the user performed with the display apparatus 100, the characteristic of the RAW image data and the like.

Figure 5:
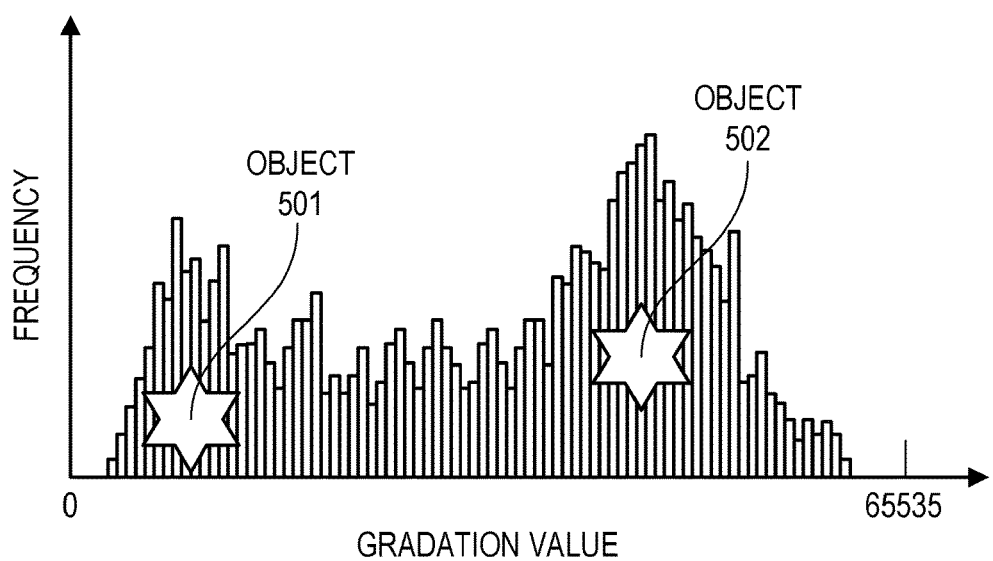
FIG. 5 shows an example of a gradation histogram of a RAW image data according to Practical Example 1.
Figure 6:
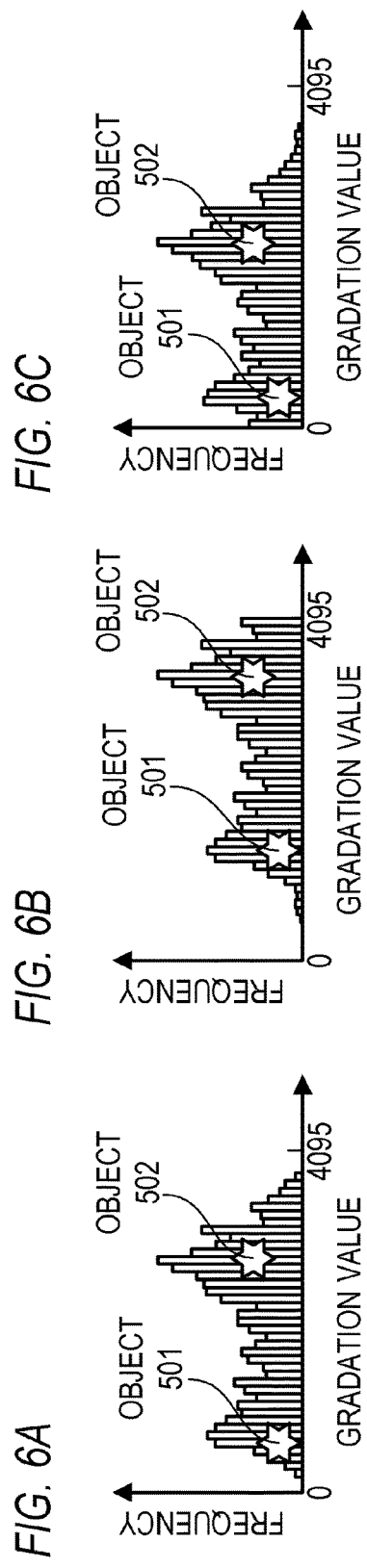
FIGS. 6A to 6C show examples of a gradation histogram of a developed image data according to Practical Example 1.

FIG. 5 is an example of a gradation histogram (histogram of gradation values) of the RAW image data. The abscissa in FIG. 5 indicates the gradation value of the RAW image data, and the ordinate in FIG. 5 indicates the frequency (number of pixels) of each gradation value. FIG. 5 is an example of the RAW image data in which an object 501 having low gradation values and an object 502 having high gradation values exist. FIGS. 6A and 6B are examples of the gradation histograms of the developed image data which was generated from the RAW image data in FIG. 5. FIG. 6A is a case where the reference development parameter is used, and FIG. 6B is a case where the first development parameter is used. In concrete terms, FIG. 6A is a gradation histogram of the developed image data acquired based on the correspondence in FIG. 3A. FIG. 6B is a gradation histogram of the developed image data acquired based on the correspondence in FIG. 3B.

As depicted in FIG. 6A, if the reference development parameter is used, a gradation histogram similar to the gradation histogram in FIG. 5 (gradation histogram of the RAW image data) is acquired as the gradation histogram of the developed image data. If the first development parameter is used, on the other hand, a gradation histogram which generally shifts to the higher gradation side (on the side where gradation values are higher), compared with the gradation histogram in FIG. 6A, is acquired, as shown in FIG. 6B. Therefore the gradation values of the objects 501 and 502 (gradation values of the developed image data) are shifted to the higher gradation side by changing the development parameter from the reference development parameter to the first development parameter. As mentioned above, in Practical Example 1, the display brightness is higher as the gradation value of the developed image data is greater. Hence, even if the emission brightness of the backlight unit 112 is constant, the display brightness of the objects 501 and 502 can be increased by shifting the gradation values of the objects 501 and 502 (gradation values of the developed image data) to the higher gradation side.

Therefore in Practical Example 1, in a case where the first brightness is less than the first threshold, the development processing using the first development parameter is performed. In other words, the development processing using the first development parameter is performed in the case where the first brightness is lower than the reference display brightness of a standard display apparatus. As mentioned above, if the first brightness is less than the first threshold and the reference development parameter is used, it is highly probable that display becomes darker than the previous display. Therefore in Practical Example 1, the development processing is performed using the first development parameter if the first brightness is less than the first threshold. Thereby display brightness that is higher than the display brightness in the case of using the reference development parameter can be implemented, and display close to the previous display can be implemented.

The case where processing advances from step S205 to step S207 will be described. In step S207, the parameter control unit 106 sets the second development parameter. Then processing in step S208 and processing in step S209 are performed. The second development parameter may be a predetermined development parameter, or may be a development parameter that can be appropriately changed. In Practical Example 1, the parameter control unit 106 generates the second development parameter by correcting the reference development parameter.

If the first brightness is higher than the second threshold and the reference development parameter is used, it is highly probable that display becomes brighter than the previous display. Therefore in Practical Example 1, a development parameter, which satisfies the following condition 3-1 for at least one of a plurality of possible gradation values of the RAW image data, is used as the second development parameter. As mentioned above, in Example 1, the display brightness is higher as the gradation value of the developed image data is greater. Hence the condition 3-1 can also be regarded as the following condition 3-2.

Condition 3-1: As display brightness of the display apparatus 100 corresponding to the gradation value after the development processing is performed, display brightness, which is lower than the display brightness, implemented in the case of the reference development parameter, is implemented.

Condition 3-2: As a gradation value after the development processing is performed, a gradation value, which is smaller than the gradation value acquired in the case of using the reference development parameter, is acquired.

Figure 3C:
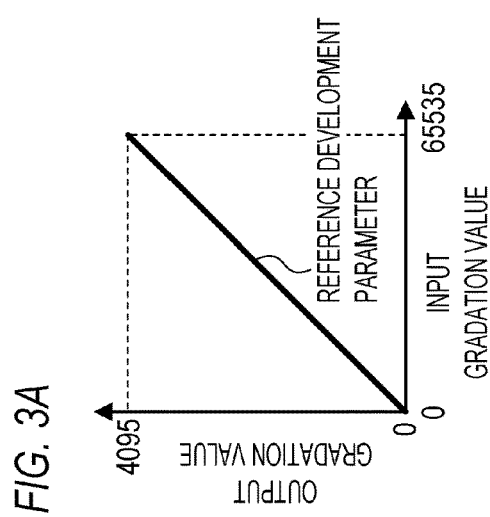

FIG. 3C shows an example of the correspondence between the input gradation value and the output gradation value. FIG. 3C is a case of using the second development parameter. In a case where the second development parameter is used, each input gradation value is converted into an output gradation value smaller than the output gradation value in FIG. 3A, as depicted in FIG. 3C. In concrete terms, in FIG. 3C, in a case where the input gradation value increases from 0 to 4095, the output gradation value increases linearly from 0 at an inclination smaller than the inclination in FIG. 3A.

The second development parameter to implement the correspondence in FIG. 3C can be acquired by correcting the reference development parameter so that the inclination of the correspondence in FIG. 3A is multiplied by M (M is smaller than 1). The value M may be a predetermined fixed value or a value that can be appropriately changed. The value M may be determined, for instance, based on the difference between the first brightness and the second threshold. A case where the first brightness is higher than the second threshold and the reference development parameter is used will be considered. In this case, it is highly probable that the difference of the display brightness from that in the previous display is larger as the difference between the first brightness and the second threshold is larger. Therefore it is preferable to determine the second development parameter such that at least one of a plurality of possible gradation values of the RAW image data satisfies the following condition 4. For example, such a second development parameter can be acquired by using a value M which was determined in the case where the difference between the first brightness and the second threshold is small.

Condition 4: As the difference between the display brightness implemented in the case of using the reference development parameter and the display brightness implemented in the case of using the second development parameter, a larger difference is implemented as the difference between the first brightness and the second threshold is larger.

The correspondence of the second development parameter (correspondence between the input gradation value and the output gradation value) is not limited to the correspondence in FIG. 3C. The correspondence of the second development parameter may be any correspondence as long as the condition 3-1 is satisfied for at least one of a plurality of possible gradation values of the RAW image data.

FIG. 6C is an example of a gradation histogram of the developed image data generated from the RAW image data in FIG. 5. FIG. 6C is a case where the second development parameter is used. In concrete terms, FIG. 6C is a gradation histogram of the developed image data acquired based on the correspondence of FIG. 3C. If the second development parameter is used, a gradation histogram, which is generally shifted to the lower gradation side (on the side where gradation values are lower), compared with the gradation histogram in FIG. 6A, is acquired, as shown in FIG. 6C. Therefore the gradation values of the objects 501 and 502 (gradation values of the developed image data) are shifted to the lower gradation side by changing the development parameter from the reference development parameter to the second development parameter. As mentioned above, in Practical Example 1, the display brightness is higher as the gradation value of the developed image data is greater. Hence even if the emission brightness of the backlight unit 112 is constant, the display brightness of the objects 501 and 502 can be decreased by shifting the gradation values of the objects 501 and 502 (gradation values of the developed image data) to the lower gradation side.

Thus according to Practical Example 1, the development processing using the second development parameter is performed in a case where the first brightness is higher than the second threshold. In other words, in a case where the first brightness is higher than the reference display brightness of a standard display apparatus, the development processing using the second development parameter is performed. As mentioned above, in the case where the first brightness is higher than the second threshold and the reference development parameter is used, it is highly probable that display is brighter than the previous display. Therefore in Practical Example 1, the development processing using the second development parameter is performed in a case where the first brightness is higher than the second threshold, whereby display brightness lower than the display brightness, in the case where the reference development parameter is used, is achieved, and display close to the previous display can be implemented.

As described above, according to Practical Example 1, the development parameter is switched depending on the first brightness. Thereby the display of the image based on the RAW image data can be made to be closer to the previous display.

Further, according to Practical Example 1, the above mentioned effect can be obtained without changing the emission brightness of the backlight unit. Hence even in the case of using a display apparatus in which emission brightness of the backlight cannot be changed, the above mentioned effect can be obtained. Furthermore, this effect can be obtained even in the case where the display brightness is temporarily limited due to the influence of power consumption, residual battery capacity, apparatus temperature and the like. For example, the display brightness is limited in a case where the emission brightness of the backlight unit, a change in the emission brightness of the backlight or the like is temporarily limited.

Further, according to Practical Example 1, only the development parameter is switched, hence only the gradation value of the developed image data is changed. Therefore the above mentioned effect can be obtained without changing the view of the areas, other than an area of the developed image data, on the screen. For example, in a case where the image based on the developed image data (developed image) and other images are simultaneously displayed, the above effect can be obtained without changing the view of the other images. The other images are, for example, a graphic image (e.g. menu image, icon image), other image content and the like. The developed image and the other images can be simultaneously displayed by using composite image data, for example, which is acquired by combining the developed image data and the image data of other images.

In the case of the example in FIG. 2, the first development parameter is set in a case where the first brightness is less than the first threshold and the second development parameter is set in a case where the first brightness is higher than the second threshold, but the present invention is not limited to this. For example, the reference development parameter may be set in one of a case where the first brightness is less than the first threshold and a case where the first brightness is higher than the second threshold. The user may specify whether the development parameter is switched. The user may be prompted whether the development parameter is switched in a case where an image based on the RAW image data is displayed. In the case of setting neither the first development parameter nor the second development parameter, the reference development parameter, for example, may be set. It may be determined whether the reference development parameter was acquired, so that the development parameter is switched only in the case, for instance, in a case where the reference development parameter was acquired. For example, it is determined whether the development parameter (reference development parameter) is included in the meta data of the RAW image data, and the development parameter is switched only in a case where the development parameter is included in the meta data. In the case where the reference development parameter was not acquired, another development parameter, which is provided in advance, may be set, for example. The development parameter may be switched only, for example, in a case where it is determined whether the display brightness is temporarily limited due to the influence of power consumption, residual battery capacity, apparatus temperature or the like, and the display brightness is in a temporarily limited state. "A case where the display brightness is temporarily limited" can be regarded as "a case where the limited display brightness is used as the first brightness".

At least one of the first threshold and the second threshold may be determined based on the meta data of the RAW image. The apparatus information on an apparatus, which was used in the previous processing using the RAW image data, may be acquired so that at least one of the first threshold and the second threshold is determined based on the apparatus information. The method of acquiring the apparatus information is not especially limited. The apparatus information may be included in the meta data of the RAW image data, so that the apparatus information is extracted from the meta data. Independent data may be acquired form the RAW image data as the apparatus information. It is highly probable that the upper limits of the display brightness are mutually different between the display apparatus that is currently in use and the previously used display apparatus. For example, the upper limits of the display brightness are probably different between a consumer display apparatus that is battery driven and a business-use display apparatus which is used in an editorial office or the like. Therefore by determining at least one of the first threshold and the second threshold based on the apparatus information, a suitable value can be used for at least one of the first threshold and the second threshold. As a result, the developed image data, which can make the display of the image based on the RAW image data to be closer to the previous display, can be set with higher certainty.

In the above description, the image processing apparatus according to Practical Example 1 is disposed in the display apparatus which has no imaging functions to generate the RAW image data by imaging, but the present invention is not limited to this. The image processing apparatus according to Practical Example 1 may be disposed in an imaging apparatus which can generate the RAW image data by imaging. The image processing apparatus according to Practical Example 1 may be disposed in a display apparatus having imaging functions (e.g. smartphone, tablet terminal). In such cases as well, display of the image based on the RAW image data can be made to be closer to the previous display by generating the developed image data according to a processing flow similar to the processing flow in FIG. 2.

As mentioned above, the image processing apparatus according to Practical Example 1, may be a separate apparatus from the display apparatus. The image processing apparatus according to Practical Example 1 may be disposed in an apparatus which does not include a display function to display an image based on the developed image data. The image processing apparatus according to Practical Example 1 may be disposed in a PC which does not include a display function. In this case, the developed image data generated by the PC is sent from the PC to a display apparatus which is separate from the PC, and the image based on the developed image data is displayed on the display apparatus.

Figure 7:
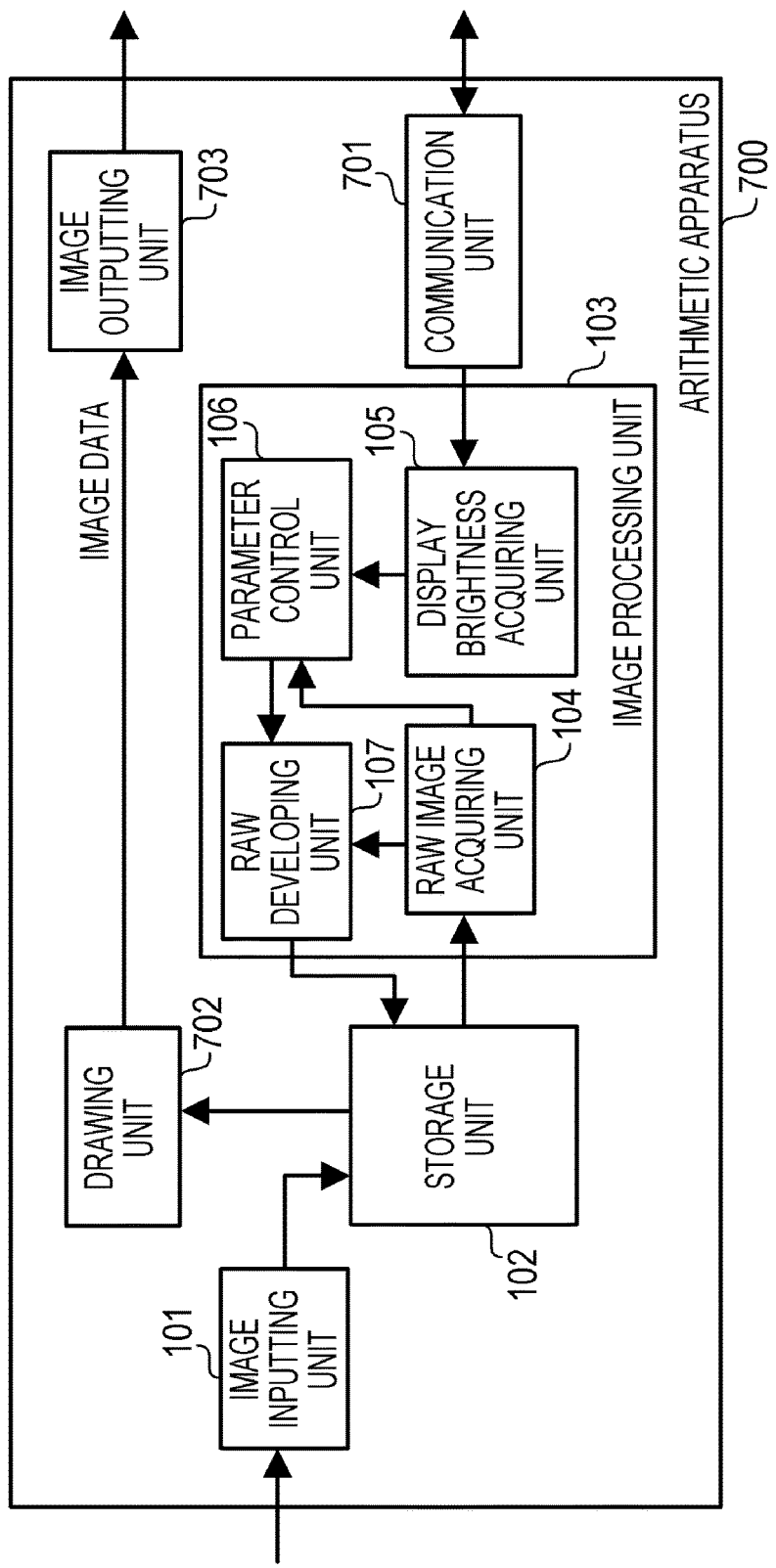
FIG. 7 is a block diagram depicting an example of a functional configuration of an arithmetic apparatus according to Practical Example 1.

FIG. 7 is a block diagram depicting an example of a functional configuration of an arithmetic apparatus (PC) 700 having the image processing apparatus according to Practical Example 1. In FIG. 7, a functional unit the same as that in FIG. 1 is denoted with the same reference signs as in FIG. 1. As depicted in FIG. 7, the arithmetic apparatus 700 includes an image inputting unit 101, a storage unit 102, an image processing unit 103, a communication unit 701, a drawing unit 702 and an image outputting unit 703.

The communication unit 701 performs communication with a display apparatus (not illustrated), and acquires the first brightness information of the display apparatus. Then the communication unit 701 outputs the acquired first brightness information to the display brightness acquiring unit 105 of the image processing unit 103. For example, the communication unit 701 is constituted by an apparatus which can execute serial communication with a display apparatus (not illustrated) and a driver thereof. The communication unit 701 acquires the first brightness information by performing serial communication. The communication unit 701 may be integrated with the image outputting unit 703. The first brightness information may be acquired by communication supported by various image interface standards. The first brightness information may be acquired from an apparatus other than the display apparatus.

The image processing unit 103 of the arithmetic apparatus 700 has functions similar to the image processing unit 103 in FIG. 1. The image processing unit 103 of the arithmetic apparatus 700, however, records the generated developed image data in the storage unit 102.

The drawing unit 702 generates image data for displaying (display image data) using one or more image data (e.g. developed image data, graphic image data provided in advance) stored in the storage unit 102. Then the drawing unit 702 outputs the display image data to the image outputting unit 703.

The image outputting unit 703 outputs the display image data outputted from the drawing unit 702 to the display apparatus (not illustrated). Thereby the image based on the developed image data generated by the image processing unit 103 is displayed on the display apparatus. The display image data may be outputted to the display apparatus via a cable or may be outputted to the display apparatus wirelessly.

By using the above mentioned arithmetic apparatus 700, the display of the image based on the RAW image data can be made to be closer to the previous display in a case where the development processing is performed in an apparatus that is separated from the display apparatus.

The image processing apparatus according to Practical Example 1 may be disposed in an arithmetic apparatus on a cloud (network). In this case, the developed image data generated by the arithmetic apparatus is sent from the arithmetic apparatus to the display apparatus that is separate from the arithmetic apparatus, and an image based on the developed image data is displayed on the display apparatus.

Figure 8:
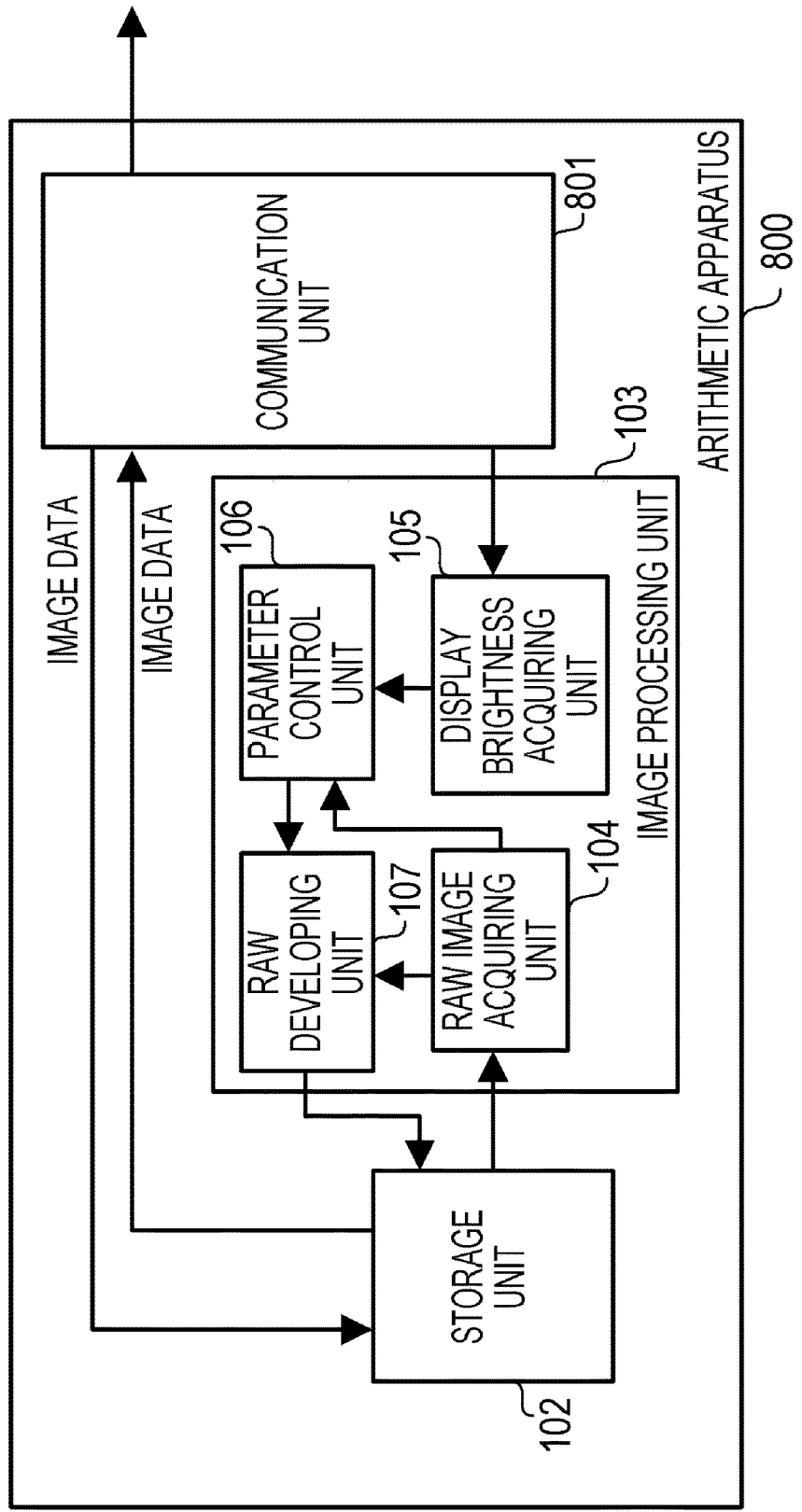
FIG. 8 is a block diagram depicting an example of a functional configuration of an arithmetic apparatus according to Practical Example 1.

FIG. 8 is a block diagram depicting an example of a functional configuration of an arithmetic apparatus 800 having the image processing apparatus according to Practical Example 1. The arithmetic apparatus 800 is disposed on a cloud. In FIG. 8, a functional unit the same as that in FIG. 1 is denoted with the same reference signs as in FIG. 1. As depicted in FIG. 8, the arithmetic apparatus 800 includes a storage unit 102, an image processing unit 103 and a communication unit 801.

The communication unit 801 acquires the RAW image data transmitted form an upload apparatus (not illustrated), and records the acquired RAW image data in the storage unit 102. The upload apparatus is an apparatus to upload the RAW image data to a cloud. The communication unit 801 also acquires first brightness information from the download apparatus (display apparatus), which is not illustrated, by communicating with the download apparatus. The communication unit 801 outputs the acquired first brightness information to the image processing unit 103. The communication unit 801 also outputs the developed image data generated by the image processing unit 103 to the download apparatus (not illustrated). Thereby the image based on the developed image data generated by the image processing unit 103 is displayed on the download apparatus. The communication unit 801 transmits/receives data via a network, such as the Internet. The download apparatus to output the first brightness information may be an apparatus which is different from the download apparatus to acquire the developed image data. The download apparatus to output the first brightness information may not be a display apparatus.

The image processing unit 103 of the arithmetic apparatus 800 has the same functions as the image processing unit 103 in FIG. 1. However, the image processing unit 103 of the arithmetic apparatus 800 records the generated developed image data in the storage unit 102. The communication unit 801 reads the developed image data from the storage unit 102, and outputs the read developed image data to the download apparatus.

By using the above mentioned arithmetic apparatus 800, the display of an image based on the RAW image data can be made to be closer to the previous display in the case where the development processing is performed on a cloud.

Practical Example 2

Practical Example 2 of the present invention will be described. In Practical Example 2, a display system having a first display apparatus and a second display apparatus will be described. The first display apparatus is a display apparatus which is used for the current display of an image based on the RAW image data. The second display apparatus is a display apparatus which is used in the previous display of the image based on the RAW image data. For each of the first display apparatus and the second display apparatus, a display apparatus, an imaging apparatus, a smartphone, a tablet terminal, a PC (arithmetic apparatus), an arithmetic apparatus on a cloud and the like can be used.

In the display system according to Practical Example 2, the second display apparatus stores the second brightness information on second brightness, which is the reference display brightness of the second display apparatus, and outputs the RAW image data and the second brightness information to the first display apparatus. The second brightness information can be regarded as "at least a part of the apparatus information described in Practical Example 1". In Practical Example 2, the second brightness can be changed, and information on the second brightness in the previous period of processing (processing for displaying an image based on the RAW image data in the past) is used as the second brightness information. The second brightness may be a predetermined fixed value. Then the first display apparatus determines the development parameter based on the first brightness information on first brightness, which is the reference display brightness of the first display apparatus, and the acquired second brightness information, so that the display of the image based on the RAW image data becomes close to the previous display in the second display apparatus.

In Practical Example 2, each of the first display apparatus and the second display apparatus has an image processing apparatus (image processing unit) which executes the development processing, but the present invention is not limited to this. The image processing apparatus of the first display apparatus may be an apparatus that is separate from the first display apparatus, and the image processing apparatus of the second display apparatus may be an apparatus that is separate from the second display apparatus. Further, in Practical Example 2, the second display apparatus, which has imaging functions to generate the RAW image data by imaging, will be described, but the second display apparatus may not include the imaging functions. For example, the RAW image data may be generated by an imaging apparatus that is separate from the second display apparatus, performing imaging operations. The first display apparatus may acquire the RAW image data from an apparatus other than the second display apparatus, or may acquire the second brightness information from an apparatus other than the second display apparatus.

Figure 9:
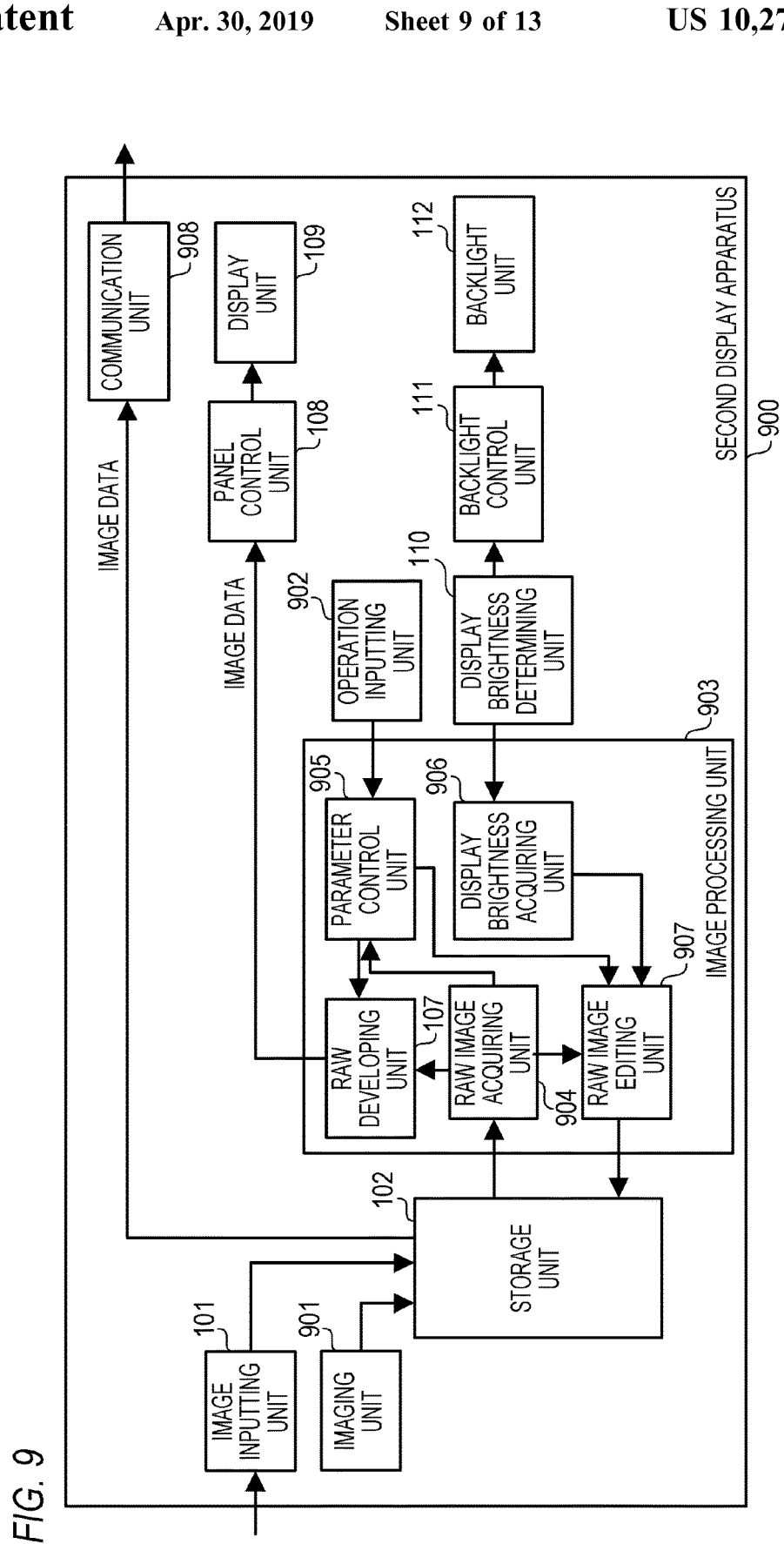
FIG. 9 is a block diagram depicting an example of a functional configuration of a second display apparatus according to Practical Example 2.

FIG. 9 is a block diagram depicting an example of a functional configuration of a second display apparatus 900 according to Practical Example 2. In FIG. 9, a functional unit the same as that in Practical Example 1 (FIG. 1) is denoted with the same reference signs as in Practical Example 1. As depicted in FIG. 9, the second display apparatus 900 includes an image inputting unit 101, a storage unit 102, a panel control unit 108, a display unit 109, a display brightness determining unit 110, a backlight control unit 111, and a backlight unit 112. The second display apparatus 900 also includes an imaging unit 901, an operation inputting unit 902, an image processing unit 903, and a communication unit 908.

The imaging unit 901 generates the RAW image data by imaging, and records the RAW image data in the storage unit 102. In concrete terms, the imaging unit 901 converts light, which was inputted from outside the second display apparatus 900 via the imaging lens, into an electric signal (analog data), and converts analog data into digital data. Thereby the RAW image data is generated.

The operation inputting unit 902 accepts the operation which the user performs to the second display apparatus 900. In Practical Example 2, the operation inputting unit 902 accepts the operation related to image quality adjustment processing (image quality adjustment operation), such as gamma correction processing and white balance adjustment processing. Then the operation inputting unit 902 outputs the control signal, in accordance with the image quality adjustment operation, to the image processing unit 903. The "control signal in accordance with the image quality adjustment operation" can also be regarded as the "control signal in accordance with the image quality desired by the user of the second display apparatus 900".

The image processing unit 903 performs the developing processing, based on the control signal acquired from the operation inputting unit 902, on the RAW image data acquired from the storage unit 102, so as to generate the developed image data. Then the image processing unit 903 outputs the developed image data to the panel control unit 108. Here the "RAW image data acquired from the storage unit 102" is the "RAW image data acquired by the image inputting unit 101", or the "RAW image data generated by the imaging unit 901".

The image processing unit 903 acquires the second brightness information related to the second brightness, which is used in a case where the development processing is executed, from the display brightness determining unit 110.

In concrete terms, the image processing unit 903 acquires the second brightness information related to the second brightness, which was used in a case where the second display apparatus displayed the image based on the RAW image data, from the display brightness determining unit 110. Then the image processing unit 903 attaches the acquired second brightness information to the acquired RAW image data, and records the RAW image data with the attached second brightness information in the storage unit 102. The second brightness information is attached to the RAW image data for at least a part of the meta data of the RAW image data.

The communication unit 908 reads the RAW image data with the attached second brightness information from the storage unit 102, and outputs the read RAW image data to the external apparatus (e.g. server) of the second display apparatus 900 via a network, such as the Internet. The first display apparatus acquires the RAW image data with the attached second brightness information from such an apparatus as a server. The communication unit 908 may directly output the RAW image data with the attached second brightness information to the first display apparatus using an image interface or the like without using another apparatus. The RAW image data and the second brightness information may be outputted independently. Further, the second brightness information, which is data independent from the RAW image data, may be notified to the first display apparatus or the like, using standard communication (e.g. serial communication), communication supported by various image interface standards and the like.

The image processing unit 903 will be described in detail. The image processing unit 903 includes a RAW developing unit 107, a RAW image acquiring unit 904, a parameter control unit 905, a display brightness acquiring unit 906 and a RAW image editing unit 907.

The RAW image acquiring unit 904 acquires RAW image data from the storage unit 102, and outputs the acquired RAW image data to the parameter control unit 905, the RAW developing unit 107 and the RAW image editing unit 907.

The parameter control unit 905 determines the development parameter based on the control signal from the operation inputting unit 902. Then the parameter control unit 905 outputs the determined development parameter to the RAW developing unit 107 and the RAW image editing unit 907. Another development parameter may be used without determining the development parameter based on the control signal. For example, in a case where the development parameter is attached to the RAW image data, the development parameter attached to the RAW image data may be extracted and used. The development parameter attached to the RAW image data may be used as a default development parameter, or the like. The development parameter attached to the RAW image data may be corrected based on the control signal, and the corrected development parameter may be used.

The display brightness acquiring unit 906 acquires the second brightness information on the second brightness, to be used in a case where the development processing is executed, from the display brightness determining unit 110. For example, the display brightness acquiring unit 906 acquires the second brightness information, related to the second brightness acquired the instant the RAW developing unit 107 started the development processing, from the display brightness determining unit 110. Then the display brightness acquiring unit 906 outputs the acquired second brightness information to the RAW image editing unit 907.

In some cases, the second brightness may not be uniform within the screen of the second display apparatus 900. In other words, in some cases, a plurality of second brightness may exist corresponding to a plurality of areas within the screen. In such a case, for example, the display brightness determining unit 110 may generate information related to at least any one of the maximum value of the plurality of second brightness, the minimum value of the plurality of second brightness, and an average value of the plurality of second brightness, as the second brightness information.

The second brightness information is not limited to information related to the second brightness acquired the instant the development processing started. For example, the second brightness information may be information related to the second brightness acquired the instant the user started the image quality adjustment operation. In some cases, the second display apparatus 900 may display images based on the RAW image data while changing the second brightness among a plurality of display brightness. Therefore information on a representative value (e.g. maximum value, minimum value, average value, median value, mode) of the plurality of second brightness corresponding respectively to a plurality of timings in a period of the previous processing may be generated as the second brightness information. Information on the time average of the second brightness, during the period when the image based on the RAW image data is displayed, may be generated as the second brightness information.

Since the method of determining the second brightness is not especially limited, the second brightness may depend on the characteristic value on the brightness of the RAW image data. A characteristic value is a representative value of the gradation values of the RAW image data, a histogram of the gradation values of the RAW image data or the like. For example, in a case where the average gradation value (average value of gradation value, average picture level (APL)) of the RAW image data is greater than the threshold, the second gradation value may be limited to display brightness lower than the predetermined value. This processing is called, for instance, "auto brightness limiter (ABL)". Therefore such information as the correspondence of the characteristic value and the second brightness, or a characteristic of ABL, may be generated as the second brightness information.

The RAW image editing unit 907 attaches, as meta data, the development parameter determined by the parameter control unit 905 and the second brightness information acquired by the display brightness acquiring unit 906 to the RAW image data outputted from the RAW image acquiring unit 904. Then the RAW image editing unit 907 records the RAW image data with the attached meta data in the storage unit 102. In Practical Example 2, the development parameter attached to the RAW image data is used as the reference development parameter in the first display apparatus. As mentioned in Practical Example 1, the reference development parameter is not especially limited. A development parameter which is different from the development parameter attached to the RAW image data may be used as the reference development parameter. For example, a development parameter, which is determined for the first display apparatus in advance, may be used as the reference development parameter. Therefore the attachment of the development parameter in the RAW image editing unit 907 may be omitted.

Figure 10:
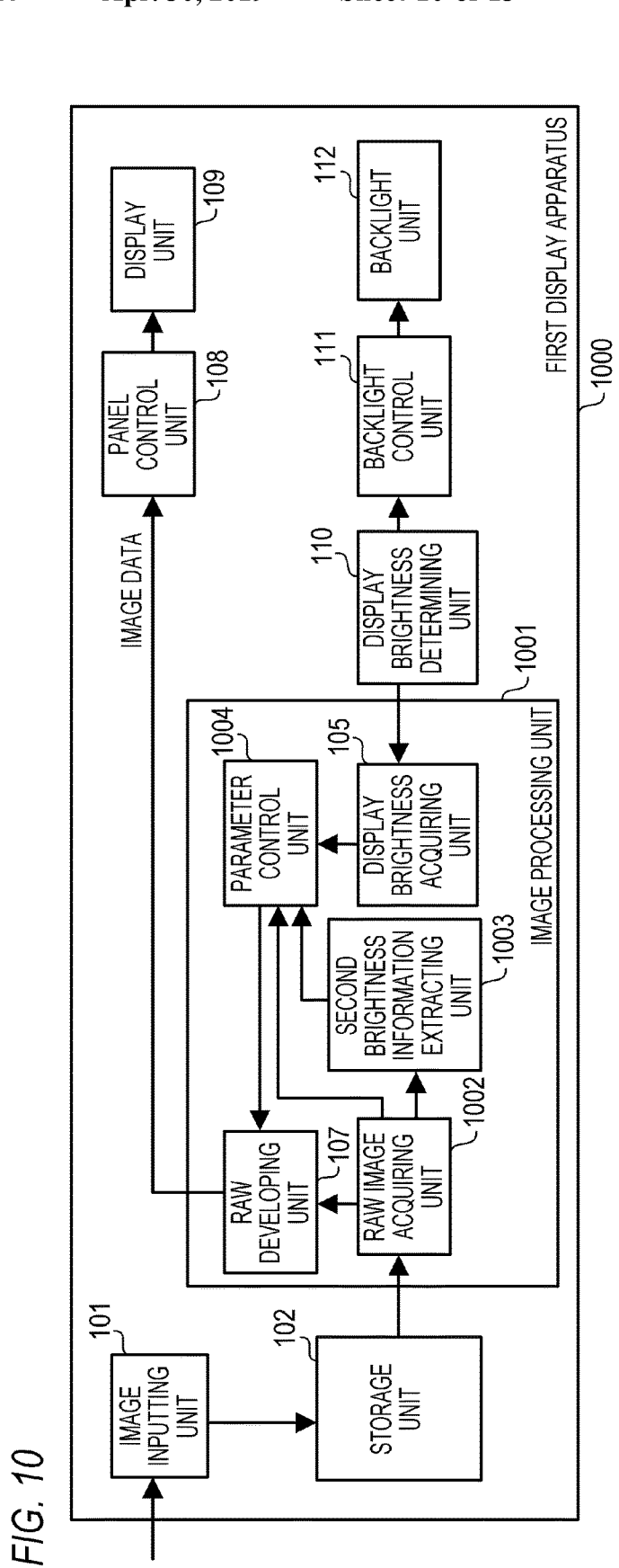
FIG. 10 is a block diagram depicting an example of a functional configuration of a first display apparatus according to Practical Example 2.

FIG. 10 is a block diagram depicting an example of a functional configuration of a first display apparatus 1000 according to Practical Example 2. In FIG. 10, a functional unit the same as that in Practical Example 1 (FIG. 1) is denoted with the same reference signs as in Practical Example 1. As depicted in FIG. 10, the first display apparatus 1000 includes an image inputting unit 101, a storage unit 102, a panel control unit 108, a display unit 109, a display brightness determining unit 110, a backlight control unit 111, a backlight unit 112 and an image processing unit 1001.

The image processing unit 1001 has the same functions as the image processing unit 103 in FIG. 1. However the image processing unit 1001 determines and sets the development parameter based on the first brightness information, and the second brightness information attached to the RAW image data. Thereby the display of the image based on the RAW image data in the first display apparatus 1000 can be made to be closer to the previous display in the second display apparatus.

Figure 11:
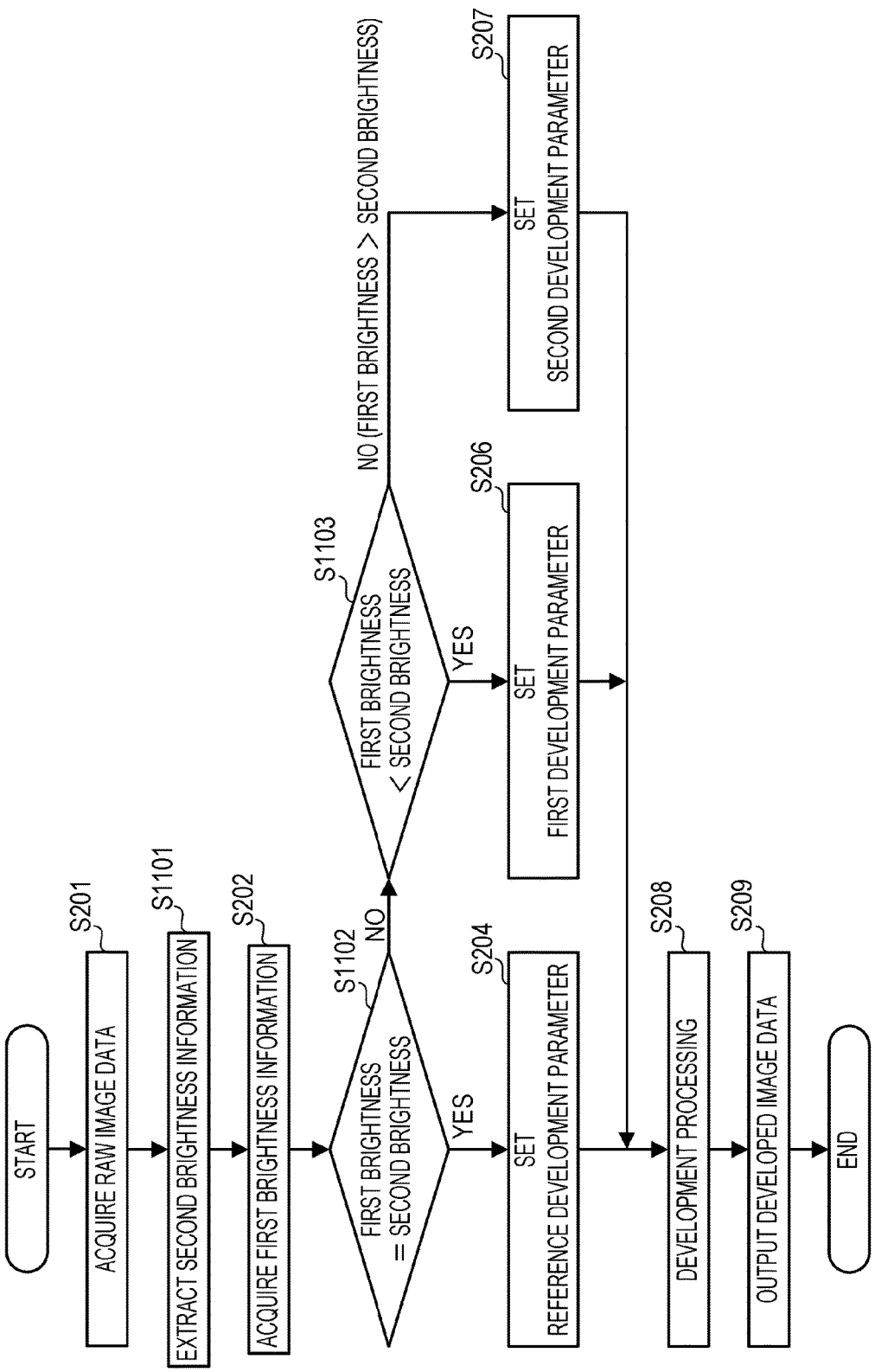
FIG. 11 is a flow chart depicting an example of a processing flow of the first display apparatus according to Practical Example 2.

The image processing unit 1001 will be described in detail. The image processing unit 1001 includes a display brightness acquiring unit 105, a RAW developing unit 107, a RAW image acquiring unit 1002, a second brightness information extracting unit 1003, and a parameter control unit 1004. FIG. 11 is a flow chart depicting an example of the processing flow of the image processing unit 1001. In FIG. 11, a processing the same as that in Practical Example 1 (FIG. 2) is denoted with the same reference signs as in Practical Example 1. The processing of each functional unit of the image processing unit 1001 will be described with reference to the flow chart in FIG. 11.

First, the RAW image acquiring unit 1002 acquires the RAW image data from the storage unit 102, and outputs the acquired RAW image data to the second brightness information extracting unit 1003, the parameter control unit 1004 and the RAW developing unit 107 (step S201). Then the second brightness information extracting unit 1003 extracts the second brightness information from the RAW image data outputted by the RAW image acquiring unit 1002, and outputs the extracted second brightness information to the parameter control unit 1004 (step S1101). Then the display brightness acquiring unit 105 acquires the first brightness information from the display brightness determining unit 110, and outputs the acquired first brightness information to the parameter control unit 1004 (step S202). The processing in step S202 may be performed in parallel with the processing in steps S201, S1101 and the like, the processing in step S202 may be performed before the processing in step S201, or the processing in step S202 may be performed before the processing in step S1101.

Then the parameter control unit 1004 determines approximately the same value as the second brightness related to the second brightness information as the first threshold, and determines approximately the same value as the second brightness related to the second brightness information as the second threshold, based on the second brightness information outputted from the second brightness information extracting unit 1003. In other words, in Practical Example 2, a value matching completely with the second brightness is determined as the first threshold and the second threshold. Then the parameter control unit 1004 determines whether the first brightness related to the first brightness information outputted from the display brightness acquiring unit 105 is the same as the second brightness (step S1102). The processing in step S1102 corresponds to the processing in step S203 in FIG. 2. If the first brightness is the same as the second brightness, the processing operations in steps S204, S208 and S209 are performed. In other words, display using the reference development parameter is performed. In Practical Example 2, as the reference development parameter, the parameter control unit 1004 extracts the development parameter from the RAW image data outputted from the RAW image acquiring unit 1002. If the first brightness is different from the second brightness, processing advances to step S1103.

The first threshold need not exactly match with the second brightness, and the second threshold need not exactly match with the second brightness. Only one of the first threshold and the second threshold may be determined based on the second brightness information. A value different from the value based on the second brightness information may be used for one of the first threshold and the second threshold.

In step S1103, the parameter control unit 1004 determines whether the first brightness is lower than the second brightness. The processing in step S1103 corresponds to the processing in step S205 in FIG. 2. If the first brightness is lower than the second brightness, the processing operations insteps S206, S208 and S209 are performed. In other words, display using the first development parameter is performed. If the first brightness is higher than the second brightness, the processing operations in steps S207, S208 and S209 are performed. In other words, display using the second development parameter is performed.

As described above, according to Practical Example 2, a value approximately the same as the second brightness is used as the threshold (at least one of the first threshold and the second threshold). Thereby in the first display apparatus, display of an image based on the RAW image data can be made to be closer to the previous display in the second display apparatus.

In the case where the first brightness is lower than the second brightness, and the reference development parameter is used, it is highly probable in the first display apparatus that the display will be darker than the previous display in the second display apparatus. Therefore in Practical Example 2, the first display apparatus performs development processing using the first development parameter in a case where the first brightness is lower than the second brightness. Thereby in the first display apparatus, the display brightness higher than the display brightness in the case of using the reference development parameter can be implemented, and display close to the previous display in the second display apparatus can be implemented.

In the case where the first brightness is higher than the second brightness and the reference development parameter is used, it is highly probable in the first display apparatus that the display will be brighter than the previous display in the second display apparatus. Therefore in Practical Example 2, the first display apparatus performs development processing using the second development parameter in a case where the first brightness is higher than the second brightness. Thereby in the first display apparatus, the display brightness lower than the display brightness in the case of using the reference development parameter can be implemented, and display close to the previous display in the second display apparatus can be implemented.

If the second brightness information is not acquired in the first display apparatus, the development parameter may be determined using the thresholds (first threshold and second threshold) which were determined using the same method as Practical Example 1.

In the first display apparatus, information on a plurality of second brightness may be acquired as the second brightness information. Further, in the first display apparatus, a plurality of development parameters corresponding to the plurality of second brightness respectively may be acquired as candidates of the reference development parameter. In the previous processing using the second display apparatus, development parameters may have been determined for a plurality of second brightness respectively because of an instruction by the user or the like. In such a case, the first display apparatus acquires the second brightness information related to a plurality of second brightness, a plurality of development parameters corresponding to the plurality of second brightness respectively and the like.

If the first display apparatus acquires the second brightness information related to a plurality of second brightness, the first display apparatus determines, for example, a threshold (at least one of the first threshold and the second threshold) based on second brightness closest to the current first brightness, in the plurality of the second brightness. Then if the first display apparatus further acquires a plurality of development parameters related to the plurality of second brightness, the first display apparatus uses, for example, the development parameter corresponding to the second brightness used for determining the threshold, as the reference development parameter. Thereby the display in the first display apparatus can be made to be closer to the display in the second display apparatus, without changing greatly the display brightness of the first display apparatus.

Figure 12:
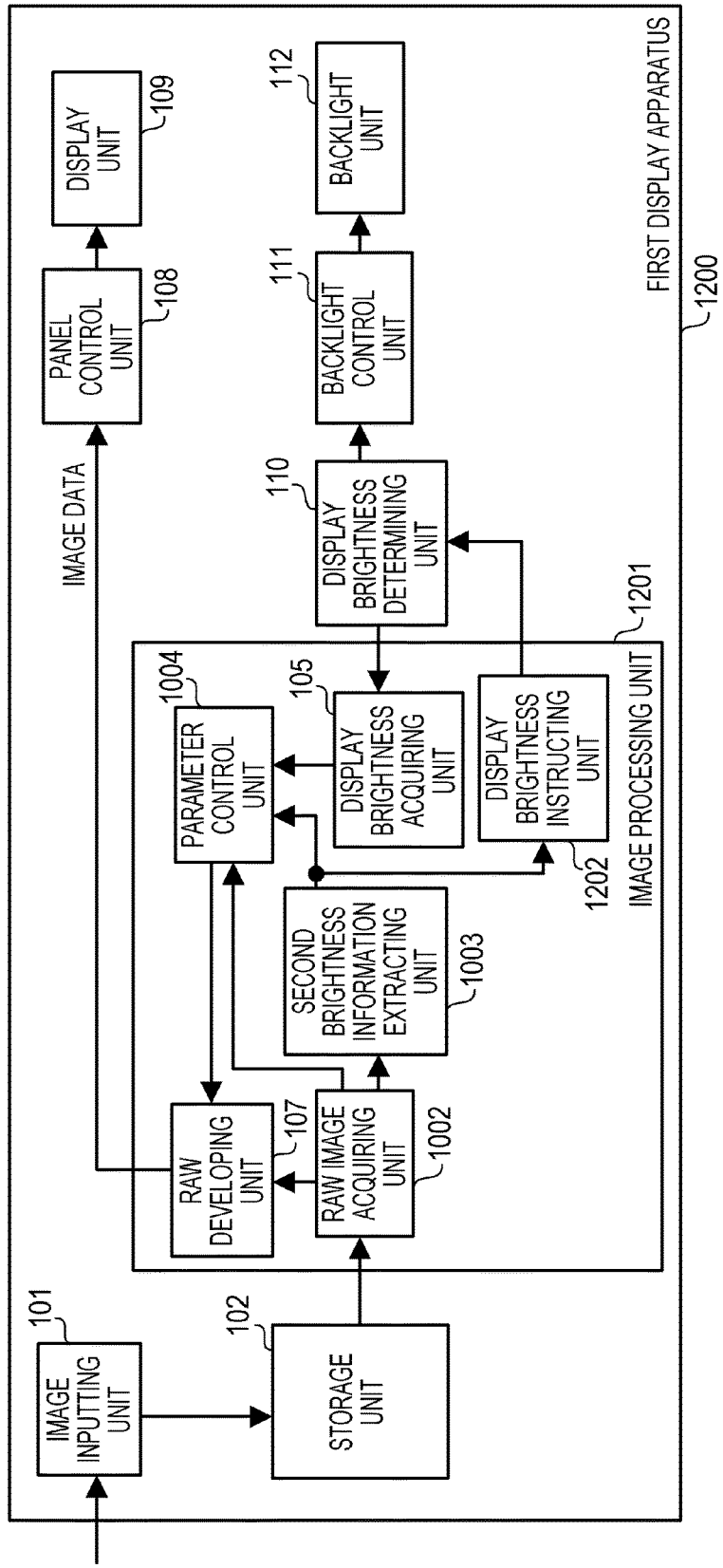
FIG. 12 is a block diagram depicting an example of a functional configuration of the first display apparatus according to Practical Example 2.

The first brightness may be appropriately changed. FIG. 12 is a block diagram depicting an example of a functional configuration of a first display apparatus 1200 in which the first display value is appropriately changed. In FIG. 12, a functional unit the same as FIG. 10 is denoted with the same reference signs. As depicted in FIG. 12, the first display apparatus 1200 includes an image inputting unit 101, a storage unit 102, a panel control unit 108, a display unit 109, a display brightness determining unit 110, a backlight control unit 111, a backlight unit 112, and an image processing unit 1201. The image processing unit 1201 includes a display brightness acquiring unit 105, a RAW developing unit 107, a RAW image acquiring unit 1002, a second brightness information extracting unit 1003, a parameter control unit 1004, and a display brightness instructing unit 1202.

The display brightness instructing unit 1202 determines the first brightness in accordance with the second brightness related to the second brightness information extracted by the second brightness information extracting unit 1003. Then the display brightness instructing unit 1202 instructs the display brightness determining unit 110 to set the determined first brightness. The display brightness determining unit 110 in FIG. 12 has the same functions as the display brightness determining unit 110 in FIG. 1 and FIG. 10. However, if the display brightness instructing unit 1202 instructs to set first brightness, the display brightness determining unit 110 in FIG. 12 outputs the first brightness information related to this first brightness (first brightness in accordance with the second brightness) to the display brightness acquiring unit 105 and the backlight control unit 111 (update of first brightness).

Figure 13:
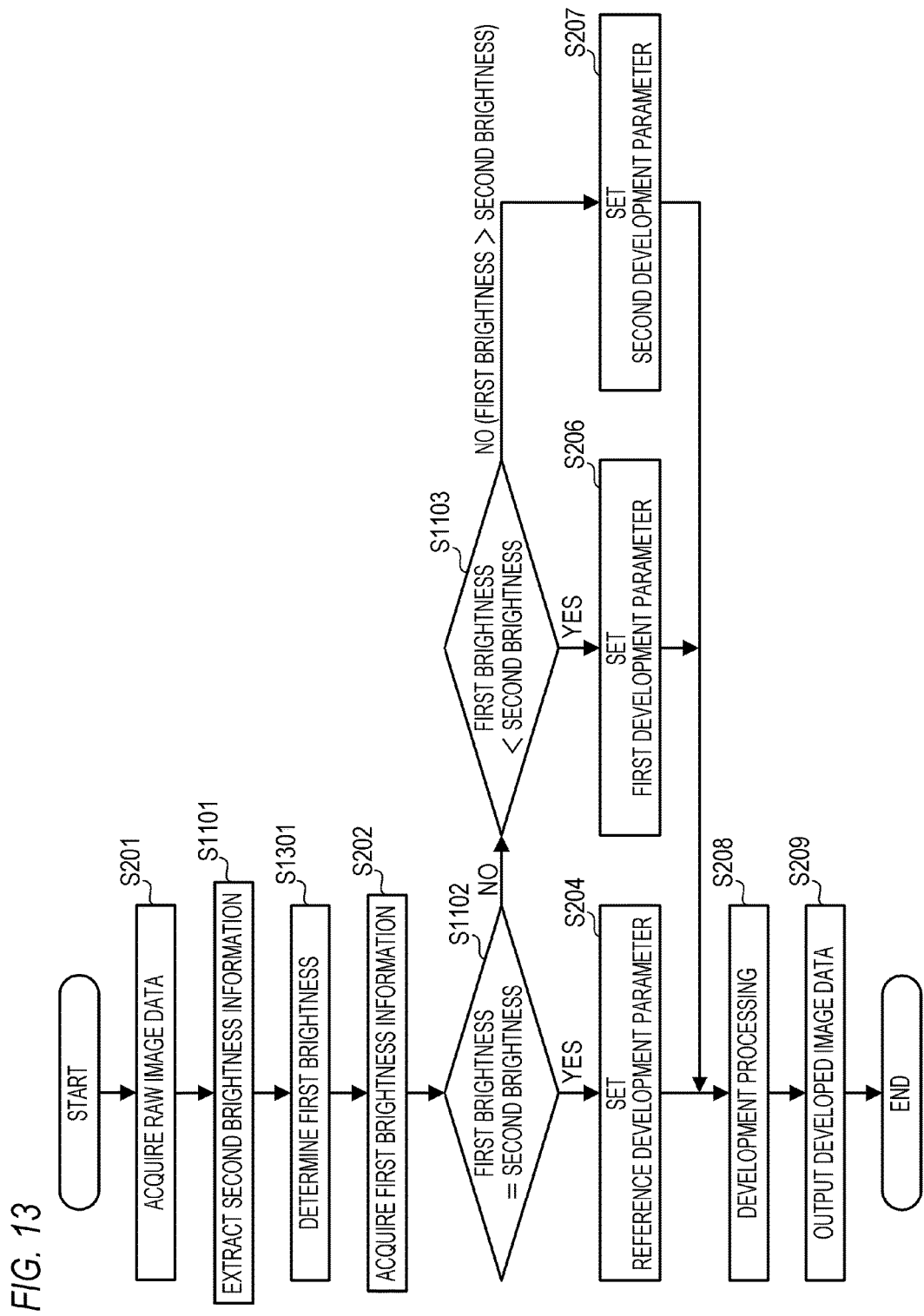
FIG. 13 is a flow chart depicting an example of the processing flow of the first display apparatus according to Practical Example 2.

FIG. 13 is a flow chart depicting an example of the processing flow of the image processing unit 1201. In FIG. 13, processing operations the same as FIG. 11 is denoted with the same reference signs as in FIG. 11. As depicted in the flow chart in FIG. 13, the processing in step S1301 is performed in the image processing unit 1201 between the processing in step S1101 and the processing in step S202.

In step S1301, the display brightness instructing unit 1202 determines the first brightness in accordance with the second brightness related to the second brightness information extracted by the second brightness information extracting unit 1003. For example, the display brightness instructing unit 1202 determines the same display brightness as the second brightness as the first brightness. If the first brightness the same as the second brightness cannot be set, the display brightness instructing unit 1202 determines, as the first brightness, the display brightness closest to the second brightness, in a plurality of display brightness which can be set as the first brightness. Then the display brightness instructing unit 1202 instructs the display brightness determining unit 110 to set the determined first brightness.

As described above, according to Practical Example 2, if the display brightness instructing unit 1202 instructs to set first brightness, the display brightness determining unit 110 outputs first brightness information relating to this first brightness (first brightness in accordance with the second brightness) to the display brightness acquiring unit 105 and the backlight control unit 111. Therefore in step S202, the display brightness acquiring unit 105 acquires the first brightness information related to the first brightness determined in step S1301. The processing operations in step S1102 and later may be performed in step S1301 based on the determined first brightness, omitting the processing in step S202.

In the first display apparatus 1200, the second brightness or display brightness close to the second brightness is set as the first brightness, and then the display of the first display apparatus 1200 is made to be closer to the display in the second display apparatus. Thereby display in the first display apparatus 1200 that is closer to the display in the second display apparatus can be implemented.

Each functional unit of the apparatuses in Examples 1 and 2 may or may not be implemented by hardware. The functions of two or more functional units may be implemented by common hardware. Each of a plurality of functions of one functional unit may be implemented by independent hardware. Two or more functions of one functional unit may be implemented by common hardware. Each functional unit may or may not be implemented by hardware. For example, the apparatus may include a processor and a memory storing a control program. And the functions of at least a part of the functional units of the apparatus may be implemented by a processor reading the control program from memory, and executing the control program.

Examples 1 and 2 are merely examples, and a configuration which is implemented by appropriately modifying or changing the configuration of Examples 1 and 2 within the scope of the subject matter of the invention, is also included in the invention. Further, a configuration which is implemented by appropriately combining the configurations of Practical Example 1 and 2 is also included in the invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-180206, filed on Sep. 15, 2016, which is hereby incorporated by reference herein in its entirety.

What is claimed is:

1. An image processing apparatus, comprising:
   at least one processor for executing a program stored in at least one memory to perform functions of:
   a first acquiring unit configured to acquire RAW image data;
   a second acquiring unit configured to acquire first brightness information related to first brightness, which is display brightness of a display unit to be used for displaying an image based on the RAW image data;
   a setting unit configured to set a development parameter to be used for development processing, based on the first brightness information acquired by the second acquiring unit; and
   a developing unit configured to perform the development processing using the development parameter set by the setting unit, on the RAW image data acquired by the first acquiring unit.

2. The image processing apparatus according to claim 1, wherein
   the setting unit performs at least one of:
   a first processing for setting a first development parameter in a case where the first brightness is less than a first threshold; and
   a second processing for setting a second development parameter in a case where the first brightness is higher than a second threshold, which is a value not less than the first threshold.

3. The image processing apparatus according to claim 2, wherein
   for at least any of a plurality of possible gradation values of the RAW image data, the first development parameter implements display brightness, which is higher than display brightness implemented in the case of using a predetermined development parameter, as display brightness corresponding to gradation value after the development processing is performed, and
   for at least any of a plurality of possible gradation values of the RAW image data, the second development parameter implements display brightness, which is lower than the display brightness implemented in the case of using the predetermined development parameter, as the display brightness corresponding to the gradation value after the development processing is performed.

4. The image processing apparatus according to claim 3, wherein
   in the first processing, the first development parameter is generated by correcting the predetermined development parameter, and
   in the second processing, the second development parameter is generated by correcting the predetermined development parameter.

5. The image processing apparatus according to claim 2, wherein
   the program is stored to further perform functions of:
   a third acquiring unit configured to acquire apparatus information related to an apparatus used in the previous processing using the RAW image data; and
   a determining unit configured to determine at least one of the first threshold and the second threshold, based on the apparatus information.

6. The image processing apparatus according to claim 5, wherein
   the apparatus used in the previous processing, includes a display apparatus configured to display an image based on the RAW image data,
   the apparatus information includes second brightness information related to second brightness, which is display brightness of the display apparatus, and
   the determining unit performs, based on the second brightness information, at least one of a processing of determining a value approximately the same as the second brightness as the first threshold, and a processing of determining a value approximately the same as the second brightness as the second threshold.

7. The image processing apparatus according to claim 6, wherein
   the second brightness information relates to the second brightness in a period of the previous processing.

8. The image processing apparatus according to claim 6, wherein
   the second brightness information relates to at least any of: an average value of a plurality of second brightness corresponding to a plurality of areas within a screen of the display apparatus respectively; a maximum value of the plurality of second brightness; a minimum value of the plurality of second brightness; a correspondence of a characteristic value related to brightness of the RAW image data and the second brightness; and an average value of a plurality of second brightness corresponding to a plurality of timings respectively in a period of the previous processing.

9. The image processing apparatus according to claim 6, wherein
   the second brightness information relates to a plurality of second brightness, and
   the determining unit determines at least one of the first threshold and the second threshold, based on second brightness closest to the first brightness, in the plurality of second brightness.

10. The image processing apparatus according to claim 6, wherein the program is stored to further perform a function of:
    an instructing unit configured to instruct the display unit to set first brightness in accordance with the second brightness.

11. The image processing apparatus according to claim 5, wherein the apparatus information is information included in meta data of the RAW image data, and the third acquiring unit extracts the apparatus information from the meta data.

12. The image processing apparatus according to claim 3, wherein the program is stored to further perform a function of:

a fourth acquiring unit configured to acquire the predetermined development parameter.

13. The image processing apparatus according to claim 12, wherein the predetermined development parameter is a development parameter included in the meta data of the RAW image data, and the fourth acquiring unit extracts the predetermined development parameter from the meta data.

14. The image processing apparatus according to claim 12, wherein the setting unit performs at least one of the first processing and the second processing in at least one of a case where the fourth acquiring unit has acquired the predetermined development parameter and a case where limited display brightness is used as the first brightness.

15. The image processing apparatus according to claim 3, wherein in the first processing, the first development parameter is determined such that a difference between the display brightness which is implemented in a case where the predetermined development parameter is used and the display brightness which is implemented in a case where the first development parameter is used, becomes grater as a difference between the first brightness and the first threshold is greater, for at least any of the plurality of possible gradation values of the RAW image data.

16. The image processing apparatus according to claim 3, wherein in the second processing, the second development parameter is determined such that a difference between the display brightness which is implemented in a case where the predetermined development parameter is used and the display brightness which is implemented in a case where the second development parameter is used, becomes greater as a difference between the first brightness and the second threshold is greater, for at least any of the plurality of possible gradation values of the RAW image data.

17. The image processing apparatus according to claim 3, wherein the predetermined development parameter is a development parameter used in a previous display of the image based on the RAW image data.

18. The image processing apparatus according to claim 3, wherein the setting unit sets the predetermined development parameter in a case where neither the first development parameter nor the second development parameter is set.

19. The image processing apparatus according to claim 3, wherein the setting unit performs the first processing, the second processing or a third processing of setting the predetermined development parameter in a case where the first brightness is not less than the first threshold and not more than the second threshold.

20. The image processing apparatus according to claim 1, wherein the first brightness is an upper limit of the display brightness of the display unit.

21. An image processing method, comprising:

a first acquiring step of acquiring RAW image data;

a second acquiring step of acquiring first brightness information related to first brightness, which is display brightness of a display unit to be used for displaying an image based on the RAW image data;

a setting step of setting a development parameter to be used for development processing, based on the first brightness information acquired in the second acquiring step; and a developing step of performing the development processing using the development parameter set in the setting step, on the RAW image data acquired in the first acquiring step.

22. A non-transitory computer readable medium that stores a program, wherein the program causes a computer to execute:

a first acquiring step of acquiring RAW image data;

a second acquiring step of acquiring first brightness information related to first brightness, which is display brightness of a display unit to be used for displaying an image based on the RAW image data;

a setting step of setting a development parameter to be used for development processing, based on the first brightness information acquired in the second acquiring step; and a developing step of performing the development processing using the development parameter set in the setting step, on the RAW image data acquired in the first acquiring step.

* * * * *